US008495418B2

(12) United States Patent
Abraham et al.

(10) Patent No.: US 8,495,418 B2
(45) Date of Patent: Jul. 23, 2013

(54) ACHIEVING ULTRA-HIGH AVAILABILITY USING A SINGLE CPU

(75) Inventors: Vineet M. Abraham, Sunnyvale, CA (US); Bill Ying Chin, San Jose, CA (US); William R. Mahoney, Campbell, CA (US); Aditya Saxena, San Jose, CA (US); Xupei Liang, San Jose, CA (US); Bill Jianqiang Zhou, Milpitas, CA (US)

(73) Assignee: Brocade Communications Systems, Inc., San Jose, CA (US)

( * ) Notice: Subject to any disclaimer, the term of this patent is extended or adjusted under 35 U.S.C. 154(b) by 404 days.

(21) Appl. No.: 12/842,936

(22) Filed: Jul. 23, 2010

(65) Prior Publication Data
US 2012/0023309 A1 Jan. 26, 2012

(51) Int. Cl.
*G06F 11/00* (2006.01)
(52) U.S. Cl.
USPC .................. 714/10; 714/11; 714/12; 714/13
(58) Field of Classification Search
USPC .................................. 714/4.11, 4.12, 11, 13
See application file for complete search history.

(56) References Cited

U.S. PATENT DOCUMENTS

| | | | |
|---|---|---|---|
| 5,159,592 A | 10/1992 | Perkins | |
| 5,278,986 A | 1/1994 | Jourdenais et al. | |
| 5,410,710 A | 4/1995 | Sarangdhar et al. | |
| 5,550,816 A | 8/1996 | Hardwick et al. | |
| 5,649,110 A | 7/1997 | Ben-Nun et al. | |
| 5,878,232 A | 3/1999 | Marimuthu | |
| 5,970,232 A | 10/1999 | Passint et al. | |
| 5,978,578 A | 11/1999 | Azarya et al. | |
| 6,047,330 A | 4/2000 | Stracke, Jr. | |
| 6,097,718 A | 8/2000 | Bion | |
| 6,101,188 A | 8/2000 | Sekine et al. | |
| 6,104,700 A | 8/2000 | Haddock et al. | |
| 6,111,888 A | 8/2000 | Green et al. | |
| 6,115,393 A | 9/2000 | Engel et al. | |
| 6,161,169 A | 12/2000 | Cheng | |
| 6,233,236 B1 | 5/2001 | Nelson et al. | |
| 6,282,678 B1 | 8/2001 | Snay et al. | |
| 6,331,983 B1 | 12/2001 | Haggerty et al. | |
| 6,374,292 B1 | 4/2002 | Srivastava et al. | |
| 6,397,242 B1 | 5/2002 | Devine et al. | |

(Continued)

FOREIGN PATENT DOCUMENTS

| | | |
|---|---|---|
| EP | 0887731 A1 | 12/1998 |
| EP | 0926859 A | 6/1999 |

(Continued)

OTHER PUBLICATIONS

U.S. Appl. No. 09/703,057, filed Oct. 31, 2000, Brewer et al.

(Continued)

*Primary Examiner* — Joshua P Lottich
(74) *Attorney, Agent, or Firm* — Kilpatrick Townsend & Stockton LLP

(57) ABSTRACT

Techniques for achieving high-availability using a single processor (CPU). In a system comprising a multi-core processor, at least two partitions may be configured with each partition being allocated one or more cores of the multiple cores. The partitions may be configured such that one partition operates in active mode while another partition operates in standby mode. In this manner, a single processor is able to provide active-standby functionality, thereby enhancing the availability of the system comprising the processor.

16 Claims, 9 Drawing Sheets

U.S. PATENT DOCUMENTS

| | | | |
|---|---|---|---|
| 6,424,629 B1 | 7/2002 | Rubino et al. | |
| 6,430,609 B1 | 8/2002 | Dewhurst et al. | |
| 6,496,510 B1 | 12/2002 | Tsukakoshi et al. | |
| 6,496,847 B1 | 12/2002 | Bugnion et al. | |
| 6,567,417 B2 | 5/2003 | Kalkunte et al. | |
| 6,570,875 B1 | 5/2003 | Hegde | |
| 6,577,634 B1 | 6/2003 | Tsukakoshi et al. | |
| 6,580,727 B1 | 6/2003 | Yim et al. | |
| 6,587,469 B1 | 7/2003 | Bragg | |
| 6,597,699 B1 | 7/2003 | Ayres | |
| 6,604,146 B1 | 8/2003 | Rempe et al. | |
| 6,608,819 B1 | 8/2003 | Mitchem et al. | |
| 6,633,916 B2 | 10/2003 | Kauffman | |
| 6,636,895 B1 | 10/2003 | Li et al. | |
| 6,674,756 B1 | 1/2004 | Rao et al. | |
| 6,675,218 B1 | 1/2004 | Mahler et al. | |
| 6,678,248 B1 | 1/2004 | Haddock et al. | |
| 6,680,904 B1 | 1/2004 | Kaplan et al. | |
| 6,691,146 B1 | 2/2004 | Armstrong et al. | |
| 6,704,925 B1 | 3/2004 | Bugnion | |
| 6,711,672 B1 | 3/2004 | Agesen | |
| 6,725,289 B1 | 4/2004 | Waldspurger et al. | |
| 6,731,601 B1 | 5/2004 | Krishna et al. | |
| 6,732,220 B2 | 5/2004 | Babaian et al. | |
| 6,763,023 B1 | 7/2004 | Gleeson et al. | |
| 6,785,886 B1 | 8/2004 | Lim et al. | |
| 6,789,156 B1 | 9/2004 | Waldspurger | |
| 6,791,980 B1 | 9/2004 | Li | |
| 6,795,966 B1 | 9/2004 | Lim et al. | |
| 6,847,638 B1 | 1/2005 | Wu | |
| 6,859,438 B2 | 2/2005 | Haddock et al. | |
| 6,880,022 B1 | 4/2005 | Waldspurger et al. | |
| 6,898,189 B1 | 5/2005 | Di Benedetto et al. | |
| 6,910,148 B1 | 6/2005 | Ho et al. | |
| 6,938,179 B2 | 8/2005 | Iyer et al. | |
| 6,944,699 B1 | 9/2005 | Bugnion et al. | |
| 6,961,806 B1 | 11/2005 | Agesen et al. | |
| 6,961,941 B1 | 11/2005 | Nelson et al. | |
| 6,975,587 B1 | 12/2005 | Adamski et al. | |
| 6,975,639 B1 | 12/2005 | Hill et al. | |
| 7,039,720 B2 | 5/2006 | Alfieri et al. | |
| 7,058,010 B2 | 6/2006 | Chidambaran et al. | |
| 7,061,858 B1 | 6/2006 | Di Benedetto et al. | |
| 7,065,059 B1 | 6/2006 | Zinin | |
| 7,093,160 B2 | 8/2006 | Lau et al. | |
| 7,188,237 B2 | 3/2007 | Zhou et al. | |
| 7,194,652 B2 | 3/2007 | Zhou et al. | |
| 7,236,453 B2 | 6/2007 | Visser et al. | |
| 7,269,133 B2 | 9/2007 | Lu et al. | |
| 7,284,236 B2 | 10/2007 | Zhou et al. | |
| 7,292,535 B2 | 11/2007 | Folkes et al. | |
| 7,305,492 B2 | 12/2007 | Bryers et al. | |
| 7,308,503 B2 | 12/2007 | Giraud et al. | |
| 7,315,552 B2 | 1/2008 | Kalkunte et al. | |
| 7,317,722 B2 | 1/2008 | Aquino et al. | |
| 7,324,500 B1 | 1/2008 | Blackmon et al. | |
| 7,327,671 B2 | 2/2008 | Karino et al. | |
| 7,339,903 B2 | 3/2008 | O'Neill | |
| 7,360,084 B1 | 4/2008 | Hardjono | |
| 7,362,700 B2 | 4/2008 | Frick et al. | |
| 7,382,736 B2 | 6/2008 | Mitchem et al. | |
| 7,385,977 B2 | 6/2008 | Wu et al. | |
| 7,406,037 B2 | 7/2008 | Okita | |
| 7,417,947 B1 | 8/2008 | Marques et al. | |
| 7,417,990 B2 | 8/2008 | Ikeda et al. | |
| 7,418,439 B2 | 8/2008 | Wong | |
| 7,441,017 B2 | 10/2008 | Watson et al. | |
| 7,447,225 B2 | 11/2008 | Windisch et al. | |
| 7,483,370 B1 | 1/2009 | Dayal et al. | |
| 7,483,433 B2 | 1/2009 | Simmons et al. | |
| 7,518,986 B1 | 4/2009 | Chadalavada et al. | |
| 7,522,521 B2 | 4/2009 | Bettink et al. | |
| 7,535,826 B1 | 5/2009 | Cole et al. | |
| 7,599,284 B1 | 10/2009 | Di Benedetto et al. | |
| 7,609,617 B2 | 10/2009 | Appanna et al. | |
| 7,620,953 B1 | 11/2009 | Tene et al. | |
| 7,656,409 B2 | 2/2010 | Cool et al. | |
| 7,694,298 B2 | 4/2010 | Goud et al. | |
| 7,720,066 B2 | 5/2010 | Weyman et al. | |
| 7,729,296 B1 | 6/2010 | Choudhary | |
| 7,739,360 B2 | 6/2010 | Watson et al. | |
| 7,751,311 B2 | 7/2010 | Ramaiah et al. | |
| 7,787,360 B2 | 8/2010 | Windisch et al. | |
| 7,787,365 B1 | 8/2010 | Marques et al. | |
| 7,788,381 B2 | 8/2010 | Watson et al. | |
| 7,802,073 B1 | 9/2010 | Cheng et al. | |
| 7,804,769 B1 | 9/2010 | Tuplur et al. | |
| 7,804,770 B2 | 9/2010 | Ng | |
| 7,805,516 B2 | 9/2010 | Kettler et al. | |
| 7,830,802 B2 | 11/2010 | Huang et al. | |
| 7,843,920 B2 | 11/2010 | Karino et al. | |
| 7,886,195 B2* | 2/2011 | Mayer | 714/38.1 |
| 7,894,334 B2* | 2/2011 | Wen et al. | 370/217 |
| 7,929,424 B2 | 4/2011 | Kochhar et al. | |
| 7,940,650 B1 | 5/2011 | Sandhir et al. | |
| 7,944,811 B2 | 5/2011 | Windisch et al. | |
| 7,974,315 B2 | 7/2011 | Yan et al. | |
| 8,009,671 B2 | 8/2011 | Guo et al. | |
| 8,014,394 B2 | 9/2011 | Ram | |
| 8,028,290 B2 | 9/2011 | Rymarczyk et al. | |
| 8,074,110 B2* | 12/2011 | Vera et al. | 714/11 |
| 8,086,906 B2* | 12/2011 | Ritz et al. | 714/48 |
| 8,089,964 B2 | 1/2012 | Lo et al. | |
| 8,095,691 B2* | 1/2012 | Verdoorn, et al. | 710/1 |
| 8,099,625 B1* | 1/2012 | Tseng et al. | 714/15 |
| 8,102,848 B1 | 1/2012 | Rao | |
| 8,121,025 B2 | 2/2012 | Duan et al. | |
| 8,131,833 B2 | 3/2012 | Hadas et al. | |
| 8,149,691 B1 | 4/2012 | Chadalavada et al. | |
| 8,156,230 B2* | 4/2012 | Bakke et al. | 709/228 |
| 8,161,260 B2 | 4/2012 | Srinivasan | |
| 8,180,923 B2 | 5/2012 | Smith et al. | |
| 8,181,174 B2 | 5/2012 | Liu | |
| 8,291,430 B2* | 10/2012 | Anand et al. | 718/104 |
| 8,335,219 B2 | 12/2012 | Simmons et al. | |
| 8,345,536 B1 | 1/2013 | Rao et al. | |
| 2002/0035641 A1 | 3/2002 | Kurose et al. | |
| 2002/0103921 A1 | 8/2002 | Nair et al. | |
| 2002/0129166 A1 | 9/2002 | Baxter et al. | |
| 2003/0105794 A1 | 6/2003 | Jasinschi et al. | |
| 2003/0202520 A1 | 10/2003 | Witkowski et al. | |
| 2004/0001485 A1 | 1/2004 | Frick et al. | |
| 2004/0030766 A1 | 2/2004 | Witkowski | |
| 2004/0078625 A1 | 4/2004 | Rampuria et al. | |
| 2005/0036485 A1 | 2/2005 | Eilers et al. | |
| 2005/0114846 A1 | 5/2005 | Banks et al. | |
| 2005/0213498 A1 | 9/2005 | Appanna et al. | |
| 2006/0002343 A1 | 1/2006 | Nain et al. | |
| 2006/0004942 A1 | 1/2006 | Hetherington et al. | |
| 2006/0018253 A1 | 1/2006 | Windisch et al. | |
| 2006/0018333 A1 | 1/2006 | Windisch et al. | |
| 2006/0090136 A1 | 4/2006 | Miller et al. | |
| 2006/0143617 A1 | 6/2006 | Knauerhase et al. | |
| 2006/0171404 A1 | 8/2006 | Nalawade et al. | |
| 2006/0176804 A1 | 8/2006 | Shibata | |
| 2006/0224826 A1* | 10/2006 | Arai et al. | 711/114 |
| 2006/0274649 A1 | 12/2006 | Scholl | |
| 2007/0027976 A1 | 2/2007 | Sasame et al. | |
| 2007/0036178 A1 | 2/2007 | Hares et al. | |
| 2007/0076594 A1 | 4/2007 | Khan et al. | |
| 2007/0162565 A1 | 7/2007 | Hanselmann | |
| 2007/0189213 A1 | 8/2007 | Karino et al. | |
| 2008/0022410 A1 | 1/2008 | Diehl | |
| 2008/0068986 A1 | 3/2008 | Maranhao et al. | |
| 2008/0120518 A1* | 5/2008 | Ritz et al. | 714/3 |
| 2008/0159325 A1 | 7/2008 | Chen et al. | |
| 2008/0189468 A1 | 8/2008 | Schmidt et al. | |
| 2008/0201603 A1* | 8/2008 | Ritz et al. | 714/5 |
| 2008/0222633 A1 | 9/2008 | Kami | |
| 2008/0225859 A1 | 9/2008 | Mitchem | |
| 2008/0243773 A1 | 10/2008 | Patel et al. | |
| 2008/0244222 A1 | 10/2008 | Supalov et al. | |
| 2009/0028044 A1 | 1/2009 | Windisch et al. | |
| 2009/0036152 A1 | 2/2009 | Janneteau et al. | |
| 2009/0049537 A1 | 2/2009 | Chen et al. | |
| 2009/0080428 A1 | 3/2009 | Witkowski et al. | |
| 2009/0086622 A1 | 4/2009 | Ng | |

| | | | |
|---|---|---|---|
| 2009/0092135 A1 | | 4/2009 | Simmons et al. |
| 2009/0094481 A1* | | 4/2009 | Vera et al. ............... 714/11 |
| 2009/0106409 A1 | | 4/2009 | Murata |
| 2009/0198766 A1 | | 8/2009 | Chen et al. |
| 2009/0219807 A1 | | 9/2009 | Wang |
| 2009/0245248 A1 | | 10/2009 | Arberg et al. |
| 2009/0316573 A1 | | 12/2009 | Lai |
| 2010/0017643 A1 | | 1/2010 | Baba et al. |
| 2010/0039932 A1* | | 2/2010 | Wen et al. ............... 370/217 |
| 2010/0107162 A1 | | 4/2010 | Edwards et al. |
| 2010/0169253 A1 | | 7/2010 | Tan |
| 2010/0257269 A1 | | 10/2010 | Clark |
| 2010/0287548 A1 | | 11/2010 | Zhou et al. |
| 2010/0325381 A1 | | 12/2010 | Heim |
| 2010/0325485 A1* | | 12/2010 | Kamath et al. .......... 714/15 |
| 2011/0023028 A1 | | 1/2011 | Nandagopal et al. |
| 2011/0072327 A1 | | 3/2011 | Schoppmeier et al. |
| 2011/0125949 A1 | | 5/2011 | Mudigonda et al. |
| 2011/0126196 A1 | | 5/2011 | Cheung et al. |
| 2011/0154331 A1 | | 6/2011 | Ciano et al. |
| 2011/0228770 A1 | | 9/2011 | Dholakia et al. |
| 2011/0228771 A1 | | 9/2011 | Dholakia et al. |
| 2011/0228772 A1 | | 9/2011 | Dholakia et al. |
| 2011/0228773 A1 | | 9/2011 | Dholakia et al. |
| 2011/0231578 A1 | | 9/2011 | Nagappan et al. |
| 2012/0023319 A1 | | 1/2012 | Chin et al. |

FOREIGN PATENT DOCUMENTS

| | | |
|---|---|---|
| EP | 1107511 A2 | 6/2001 |
| EP | 2084605 A2 | 5/2009 |
| WO | WO 2008/054997 A2 | 5/2008 |

OTHER PUBLICATIONS

U.S. Appl. No. 12/823,073, filed Jun. 24, 2010, Nagappan et al.
U.S. Appl. No. 12/913,572, filed Oct. 27, 2010, Dholakia et al.
U.S. Appl. No. 12/913,598, filed Oct. 27, 2010, Dholakia et al.
U.S. Appl. No. 12/913,612, filed Oct. 27, 2010, Dholakia et al.
U.S. Appl. No. 12/913,650, filed Oct. 27, 2010, Dholakia et al.
Braden et al., "Integrated Services in the Internet Architecture: an Overview," Jul. 1994, RFC 1633, Network Working Group, pp. 1-28.
"Brocade Serveriron ADX 1000, 4000, and 8000 Series Frequently Asked Questions," pp. 1-10, Copyright 2009, Brocade Communications Systems, Inc.
Chen, "New Paradigm in Application Delivery Networking: Advanced Core Operating System (ACOS) and Multi-CPU Architecture—They Key to Achieving Availability, Scalability and Preformance." White Paper, May 2009, A10 Networks, 5 pages.
Cisco IP Routing Handbook, Copyright 2000, pp. 22-23, 119-135, and 405-406, M&T Books.
Demers et al., "Analysis and Simulation of a Fair Queueing Algorithm," Xerox PARC, Copyright 1989, pp. 1-12, ACM.
Extreme v. Enterasys WI Legal Transcript of Stephen R. Haddock, May 7, 2008, vol. 2, 2 pages.
Floyd et al., "Link-sharing and Resource Management Models for Packet Networks," IEEE/ACM Transactions on Networking, Aug. 1995, vol. 3, No. 4, Copyright 1995, IEEE, pp. 1-22.
Freescale Semiconductor, Inc., "Freescale's Embedded Hypervisor for QorIQ™ P4 Series Communications Platform," White Paper, Oct. 2008, Copyright 2008, pp. 1-8, Document No. EMHYPQIQTP4CPWP, Rev. 1.
Freescale Semiconductor, Inc., "Embedded Multicore: An Introduction," Jul. 2009, Copyright 2009, 73 pages, Document No. EMBMCRM, Rev. 0.
"GIGAswitch FDDI System—Manager's Guide," Part No. EK-GGMGA-MG.B01, Jun. 1993 first printing, Apr. 1995 second printing, Copyright 1995, Digital Equipment Corporation, Maynard, MA, 113 pages.
"GIGAswitch System—Manager's Guide," Part No. EK-GGMGA-MG.A01, Jun. 1993, Copyright 1993, Digital Equipment Corporation, Maynard, MA, 237 pages.
Hemminger, "Delivering Advanced Application Acceleration & Security," Application Delivery Challenge, Jul. 2007, pp. 1-3.
KaashoEk et al., "An Efficient Reliable Broadcast Protocol," Operating System Review, Oct. 4, 1989, 15 pages.

Keshav, "An Engineering Approach to Computer Networking: ATM Networks; the internet, and the Telephone Network," Addison-Wesley Professional Computing Series, part 1 of 5, May 15, 1997, Copyright 1997 by AT&T, Addison-Wesley Publishing Company, pp. 1-129.
Keshav, "An Engineering Approach to Computer Networking: ATM Networks; the internet, and the Telephone Network," Addison-Wesley Professional Computing Series, part 2 of 5, May 15, 1997, Copyright 1997 by AT&T, Addison-Wesley Publishing Company, pp. 130-260.
Keshav, "An Engineering Approach to Computer Networking: ATM Networks; the internet, and the Telephone Network," Addison-Wesley Professional Computing Series, part 3 of 5, May 15, 1997, Copyright 1997 by AT&T, Addison-Wesley Publishing Company, pp. 261-389.
Keshav, "An Engineering Approach to Computer Networking: ATM Networks; the internet, and the Telephone Network," Addison-Wesley Professional Computing Series, part 4 of 5, May 15, 1997, Copyright 1997 by AT&T, Addison-Wesley Publishing Company, pp. 390-519.
Keshav, "An Engineering Approach to Computer Networking: ATM Networks; the internet, and the Telephone Network," Addison-Wesley Professional Computing Series, part 5 of 5, May 15, 1997, Copyright 1997 by AT&T, Addison-Wesley Publishing Company, pp. 520-660.
May, et al., "An Experimental Implementation of Traffic Control for IP Networks," 1993, Sophia-Antipolis Cedex, France, 11 pages.
Moy, "OSPF Version 2," Network Working Group, RFC 2328, Apr. 1998, 204 pages.
Order Granting/Denying Request for Ex Parte Reexamination for U.S. Appl. No. 90/010,432, mailed on May 21, 2009, 18 pages.
Order Granting/Denying Request for Ex Parte Reexamination for U.S. Appl. No. 90/010,433, mailed on May 22, 2009, 15 pages.
Order Granting/Denying Request for Ex Parte Reexamination for U.S. Appl. No. 90/010,434, mailed on May 22, 2009, 20 pages.
Pangal, "Core Based Virtualization—Secure, Elastic and Deterministic Computing is Here . . . ," Blog Posting, May 26, 2009, 1 page, printed on Jul. 13, 2009, at URL: http://community.brocade.com/home/community/brocadeblogs/wingspan/blog/tags/serveri. . . .
Partridge, "A Proposed Flow Specification," Sep. 1992, RFC 1363, Network Working Group, pp. 1-20.
Riggsbee, "From ADC to Web Security, Serving the Online Community," Blog Posting, Jul. 8, 2009, 2 pages, printed on Dec. 22, 2009, at URL: http://community.brocade.com/home/community/brocadeblogs/wingspan/blog/2009/07/0 . . . .
Riggsbee, "You've Been Warned, the Revolution Will Not Be Televised," Blog Posting, Jul. 9, 2009, 2 pages, printed on Dec. 22, 2009, at URL: http://community.brocade.com/home/community/brocadeblogs/wingspan/blog/2009/07/0 . . . .
Schlansker, et al., "High-Performance Ethernet-Based Communications for Future Multi-Core Processors," SC07 Nov. 10-16, 2007, 12 pages, Copyright 2007, ACM.
TCP/IP Illustrated, vol. 2: The Implementation, Gray R. Wright and W. Richard Stevens, Addison-Wesley 1995, pp. 64, 97, 128,158,186,207,248,277,305,340,383,398,437,476,572,680, 715,756,797,1028, and 1051.
Wolf, et al., "Design Issues for High-Performance Active Routers," IEEE Journal on Selected Areas in Communications, IEEE, Inc. New York, USA, Mar. 2001, vol. 19, No. 3, Copyright 2001, IEEE, pp. 404-409.
European Search Report for Application No. EP 02254403, dated Mar. 18, 2003, 3 pages.
European Search Report for Application No. EP 02256444, dated Feb. 23, 2005, 3 pages.
Non-Final Office Action for U.S. Appl. No. 09/896,228, mailed on Jul. 29, 2005, 17 pages.
Non-Final Office Action for U.S. Appl. No. 09/896,228, mailed on Sep. 7, 2006, 17 pages.
Non-Final Office Action for U.S. Appl. No. 09/896,228, mailed on Mar. 5, 2007, 14 pages.
Final Office Action for U.S. Appl. No. 09/896,228, mailed Aug. 21, 2007, 15 pages.

Notice of Allowance for U.S. Appl. No. 09/896,228, mailed on Jun. 17, 2008, 20 pages.
Non-Final Office Action for U.S. Appl. No. 09/953,714, mailed on Dec. 21, 2004, 16 pages.
Final Office Action for U.S. Appl. No. 09/953,714, mailed on Jun. 28, 2005, 17 pages.
Non-Final Office Action for U.S. Appl. No. 09/953,714, mailed on Jan. 26, 2006, 15 pages.
Final Office Action for U.S. Appl. No. 09/953,714, mailed on Aug. 17, 2006, 17 pages.
Notice of Allowance for U.S. Appl. No. 09/953,714, mailed on Sep. 14, 2009, 6 pages.
Notice of Allowance for U.S. Appl. No. 09/953,714, mailed on Feb. 5, 2010, 10 pages.
Non-Final Office Action for U.S. Appl. No. 12/333,029, mailed on May 27, 2010, 29 pages.
Non-Final Office Action for U.S. Appl. No. 12/210,957, mailed on Sep. 2, 2009, 16 pages.
Notice of Allowance for U.S. Appl. No. 12/210,957, mailed on Feb. 4, 2010, 10 pages.
Non-Final Office Action for U.S. Appl. No. 12/333,029, mailed on Mar. 30, 2012, 15 pages.
Non-Final Office Action for U.S. Appl. No. 12/626,432 mailed on Jul. 12, 2012, 13 pages.
Non-Final Office Action for U.S. Appl. No. 12/913,572 mailed on Aug. 3, 2012, 6 pages.
Non-Final Office Action for U.S. Appl. No. 12/823,073 mailed on Aug. 6, 2012, 21 pages.
Notice of Allowance for U.S. Appl. No. 12/333,029 mailed on Aug. 17, 2012, 7 pages.
CISCO Systems, Inc., "BGP Support for Nonstop Routing (NSR) with Stateful Switchover (SSO)." Mar. 20, 2006, pp. 1-18.
CISCO Systems, Inc., "Graceful Restart, Non Stop Routing and IGP routing protocol timer Manipulation," Copyright 2008, pp. 1-4.
CISCO Systems, Inc., "Intermediate System-to-Intermediate System (IS-IS) Support for Graceful Restart (GR) and Non-Stop Routing (NSR)," Copyright 2008, pp. 1-3.
CISCO Systems, Inc., "Internet Protocol Multicast," Internetworking Technologies Handbook, 2000, 3rd Edition, Chapter 43, pp. 43-1 through 43-16.
CISCO Systems, Inc., "Multicast Quick—Start Configuration Guide," Document ID:9356, Copyright 2008-2009, 15 pages.
CISCO Systems, Inc., "Warm Reload," CISCO IOS Releases 12.3(2)T, 12.2(18)S, and 12.2(27)SBC, Copyright 2003, pp. 1-14.
Fenner, et al., "Protocol Independent Multicast—Sparse Mode (PIM-SM): Protocol Specification (Revised)." Network Working Group, RFC 4601, Aug. 2006, pp. 1-151.
Hardwick, "IP Multicast Explained," Metaswitch Networks, Jun. 2004, pp. 1-68.
IP Infusion Brochure, "ZebOS® Network Platform: Transporting You to Next Generation Networks," ip infusion™ An Access Company, Jun. 2008, pp. 1-6.
Kakadia, et al., "Enterprise Network Design Patterns: High Availability" Sun Microsystems, Inc., Sun BluePrints™ Online, Revision A, Nov. 26, 2003, pp. 1-35, at URL: http://www.sun.com/blueprints.
Kaplan, "Part 3 in the Reliability Series: NSR™ Non-Stop Routing Technology," White Paper, Avici Systems, Copyright 2002, pp. 1-8.
Khan, "IP Routing Use Cases," Cisco Press, Sep. 22, 2009, pp. 1-16, at URL:http://www.ciscopress.com/articles/printerfriendly.asp?p=1395746.
Lee, et al., "Open Shortest Path First (OSPF) Conformance and Performance Testing," White Papers, Ixia—Leader in Convergence IP Testing, Copyright 1998-2004, pp. 1-17.
Manolov, et al., "An Investigation into Multicasting, Proceedings of the 14th Annual Workshop on Architecture and System Design," (ProRISC2003), Veldhoven, The Netherlands, Nov. 2003, pp. 523-528.
Pepelnjak, et al., "Using Multicast Domains," informIT, Jun. 27, 2003, pp. 1-29, at URL:http://www.informit.com/articles/printerfriendly.aspx?p=32100.
Product Category Brochure, "J Series, M Series and MX Series Routers—Juniper Networks Enterprise Routers—New Levels of Performance, Availability, Advanced Routing Features, and Operations Agility for Today's High-Performance Businesses," Juniper Networks, Nov. 2009, pp. 1-11.
Rodbell, "Protocol Independent Multicast—Sparse Mode," CommsDesign, Dec. 19, 2009, pp. 1-5, at URL: http://www.commsdesign.com/main/9811/9811standards.htm.
Non-Final Office Action for U.S. Appl. No. 12/913,598 mailed on Sep. 6, 2012, 10 pages.
Non-Final Office Action for U.S. Appl. No. 12/913,612 mailed on Sep. 19, 2012, 11 pages.
Non-Final Office Action for U.S. Appl. No. 12/913,650 mailed on Oct. 2, 2012, 9 pages.
Notice of Allowance for U.S. Appl. No. 12/913,572 mailed on Nov. 21, 2012, 7 pages.
Final Office Action for U.S. Appl. No. 12/823,073 mailed on Jan. 23, 2013, 23 pages.
Intel® Virtualization Technology, Product Brief, "Virtualization 2.0—Moving Beyond Consolidation", 2008, 4 pages.
VMWARE., "Automating High Availability (HA) Services With VMware HA", VMware Infrastructure, Copyright ® 1998-2006, 15 pages.
VMWARE, "Resource Management with Vmware DRS", VMware Infrastructure, Copyright ® 1998-2006, 24 pages.
VMWARE, "Dynamic Balancing and Allocation of Resources for Virtual Machines", Product Datasheet, Copyright ® 1998-2006, 2 pages.
Quickspecs, "HP Online VM Migration (for HP Integrity Virtual Machines)", Wordwide—Version 4, Sep. 27, 2010, 4 pages.
VMWARE, "Live Migration for Virtual Machines Without Service Interruption", Product Datasheet, Copyright ® 2009 Vmware, Inc., 4 pages.
Burke, "Vmware Counters Oracle, Microsoft With Free Update", Nov. 13, 2007, 2 pages.
Final Office Action for U.S. Appl. No. 12/626,432 mailed on Apr. 12, 2013, 14 pages.
Notice of Allowance for U.S. Appl. No. 12/913,598 mailed on Mar. 12, 2013, 5 pages.
Notice of Allowance for U.S. Appl. No. 12/913,650 mailed on Mar. 25, 2013, 6 pages.

* cited by examiner

ACHIEVING ULTRA-HIGH AVAILABILITY USING A SINGLE CPU

CROSS-REFERENCES TO RELATED APPLICATIONS

The present application incorporates by reference for all purposes the entire contents of U.S. Non-Provisional Ser. No. 12/842,945, titled PERSISTING DATA ACROSS WARM BOOTS, filed Jul. 23, 2012.

The present application herein incorporates by reference for all purposes the entire contents of the following U.S. patents, all assigned to Brocade Communications Systems, Inc.:
(1) U.S. Pat. No. 7,188,237 B2 titled "Reboot Manager Usable to Change Firmware in a High Availability Single Processor System";
(2) U.S. Pat. No. 7,194,652 B2 titled "High Availability Synchronization Architecture"; and
(3) U.S. Pat. No. 7,284,236 B2 titled "Mechanism to Change Firmware in High Availability Single-Processor System".

BACKGROUND

The present disclosure relates to processing systems and more particularly to techniques for providing enhanced availability in single processor-based systems.

Achieving high-availability is an important design goal for any network architecture. Several networking technologies have been developed to achieve high-availability. Existing technologies facilitate high availability by providing redundant network devices or by providing multiple physical processors. For example, according to one architecture, redundant network devices are provided for forwarding data with one network device operating in active mode and the other operating in standby (or passive) mode. In this active-standby model, the active network device performs the data forwarding-related functions while the redundant second network device operates in standby mode. Upon a failover, which may occur, for example, due to an error on the active device, the standby device becomes the active device and takes over data forwarding functionality from the previously active device. The previous active device may then operate in standby mode. The active-standby model using two network devices thus strives to reduce interruptions in data forwarding.

Some network devices comprise multiple physical processors. For example, a network device may comprise two management cards, each having its own physical processor. One management card may be configured to operate in active mode while the other operates in standby mode. The active management card performs the data forwarding-related functions while the redundant second management card operates in standby mode. Upon a failover, the standby management card becomes the active card and takes over data forwarding-related functionality from the previously active management card. The previous active management card may then operate in standby mode. The active-standby model is typically used to enable various networking technologies such as graceful restart, non-stop routing (NSR), and the like.

As described above, conventional networks facilitate high-availability by providing redundant network devices or multiple physical processors. However, providing this redundancy increases the expense of the network or network device. Further, there are systems, including several network devices, and subsystems of a system that comprise only a single physical processor. These systems and subsystems cannot provide an active-standby capability. For example, line cards in a network device do not comprise redundant physical processors that can enable an active-standby model of operation. As another example, several network devices comprise only a single management card with a single physical CPU and thus do not support an active-standby model.

BRIEF SUMMARY

Embodiments of the present invention provide techniques for achieving high-availability using a single processor (CPU). In one embodiment, in a system comprising a single multi-core CPU, at least two partitions may be configured with each partition being allocated one or more cores of the multiple cores. Each partition may be configured to operate as a virtual machine. The partitions may be configured such that one partition operates in active mode while another partition operates in standby mode. In this manner, a single processor is able to provide active-standby functionality, thereby enhancing the availability of the system comprising the processor.

According to an embodiment of the present invention, techniques are provided in a system comprising a multi-core processor to support an active mode and a standby mode of operation. The plurality of cores provided by the processor may be partitioned into at least a first partition and a second partition, wherein a first set of cores from the plurality of cores is allocated to the first partition and a second set of cores from the plurality of cores is allocated to the second partition. The first set of cores may be different from the second set of cores. The first partition is configured to operate in active mode, wherein a set of functions is performed in the active mode. When the first partition is operating in active mode, the second partition may be configured to operate in a standby mode, wherein the set of functions is not performed in the standby mode. In response to an event, the second partition may be configured to start operating in the active mode instead of the first partition and to start performing the set of functions corresponding to the first mode. The first partition may be configured to operate in the standby mode after the second partition operates in the active mode.

The event that causes the second partition to become the active partition may be of various types. Examples include a reset or restart of the first partition, a software upgrade, a failure in operation of the first partition, a timeout, or an instruction to cause the second partition to operate in the first mode instead of the first partition.

In one embodiment, a hypervisor may be provided for managing the first partition and the second partition, including allocating processing and memory resources between the partitions.

In one embodiment, the active-standby mode capabilities provided by a single physical processor may be embodied in a network device such as a switch or router. The network device may comprise a multi-core processor that may be partitioned into multiple partitions, with one partition operating in active mode and another operating in standby mode. The set of functions performed in active mode may include one or more functions related to processing of a packet received by the network device. In one embodiment, the processor enabling the active-standby capability may be located on a line card of the network device. The processor may also be located on a management card of the network device.

The foregoing, together with other features and embodiments will become more apparent upon referring to the following specification, claims, and accompanying drawings.

DETAILED DESCRIPTION

In the following description, for the purposes of explanation, specific details are set forth in order to provide a thorough understanding of embodiments of the invention. However, it will be apparent that the invention may be practiced without these specific details.

Embodiments of the present invention provide techniques for achieving high-availability using a single processor (CPU). In a system comprising a multi-core processor, at least two partitions may be configured with each partition being allocated one or more cores of the multiple cores. The partitions may be configured such that one partition operates in active mode while another partition operates in standby mode. In this manner, a single processor is able to provide active-standby functionality, thereby enhancing the availability of the system comprising the processor.

For purposes of this application, the term "system" may refer to a system, a device, or a subsystem of a system or device. For example, the term "system" may refer to a network device such as a router or switch provided by Brocade Communications Systems, Inc. The term "system" may also refer to a subsystem of a system such as a management card or a line card of a router or switch.

Figure 1:
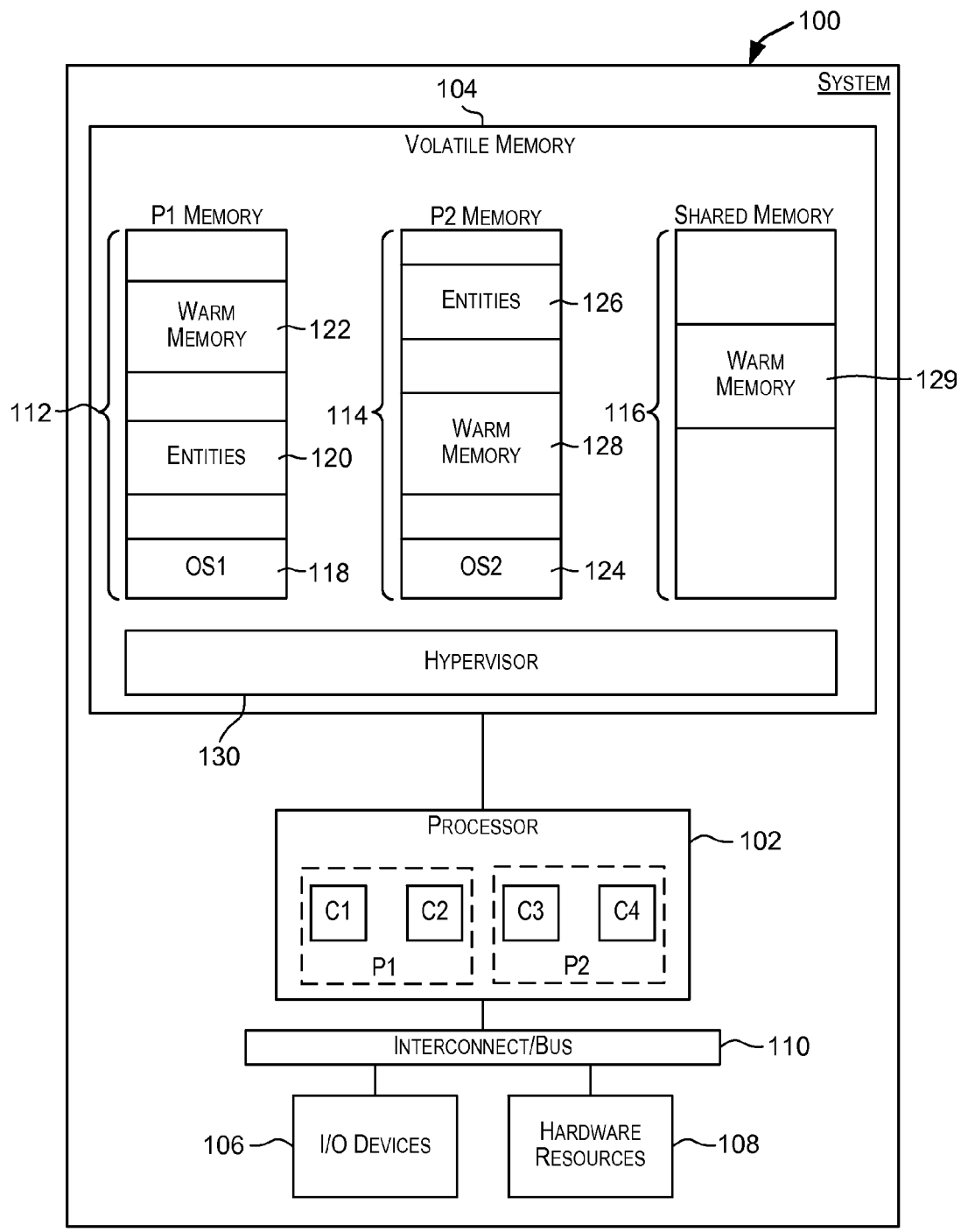
FIG. 1 is a simplified block diagram of a system 100 that may incorporate an embodiment of the present invention.

FIG. 1 is a simplified block diagram of a system 100 that may incorporate an embodiment of the present invention. System 100 comprises a single physical multi-core processor 102 coupled to a memory 104. Processor 102 is also coupled to input/output (I/O) devices 106 and to other hardware resources 108 via an interconnect/bus 110. System 100 depicted in FIG. 1 is merely an example and is not intended to unduly limit the scope of embodiments of the present invention as recited in the claims. One of ordinary skill in the art would recognize many variations, alternatives, and modifications.

Physical processor 102 represents the processing resources of system 100. In one embodiment, processor 102 is a multi-core processor comprising a plurality of processing cores. For example, in the embodiment depicted in FIG. 1, processor 102 comprises four cores: C1, C2, C3, and C4. Examples of a multi-core processor include but are not limited to various multi-core processors provided by Freescale Semiconductor, Inc., such as the QorIQ and the PowerQUICC lines of processors provided by Freescale, and others.

Volatile memory 104 represents the memory resources available to physical processor 102. Information related to runtime processing performed by processor 102 may be stored in memory 104. Memory 104 may be a RAM (e.g., SDR RAM, DDR RAM) and is sometimes referred to as the system's main memory.

Hardware resources of system 100 may include I/O devices 106 and other hardware resources 108. I/O devices 106 may include devices such as Ethernet devices, PCIe devices, eLBC devices, and others. Interconnect 110 may include one or more interconnects or buses.

In one embodiment, the processing, memory, and hardware resources of system 100 may be partitioned into one or more logical partitions (referred to herein as partitions). For example, in the embodiment depicted in FIG. 1, the processing resources provided by system 100, namely the multiple cores of processor 102, are partitioned into two logical partitions P1 and P2, with cores C1 and C2 being allocated or assigned to partition P1 and cores C3 and C4 being allocated or assigned to partition P2.

The memory resources provided by memory 104 may also be partitioned and allocated to the different partitions. For example, as depicted in FIG. 1, a memory portion 112 of memory 104 is allocated to partition P1 and a memory portion 114 is allocated to partition P2. In this manner, each partition has its own secure and private memory area that is accessible only to that partition. A portion of memory 104 may also be configured to be shared between partitions. For example, memory portion 116 is configured to be shared between partitions P1 and P2 and by hypervisor 130. This shared memory may be used for multiple purposes including messaging between the two partitions.

The memory assigned to a partition may store, during runtime, an operating system for the partition and data related to one or more entities executed by the partition. The data may include code and other data. These entities may include but are not restricted to an application, a process, a thread, an operating system (including a component of the operating system such as an operating system kernel module), a device driver, a hypervisor, and the like. For example, in the embodiment depicted in FIG. 1, memory 112 allocated to partition P1 comprises a section 118 storing an operating system OS1 for P1 and also comprises a section 120 storing data related to entities executed by partition P1. Optionally, a portion of memory 112 may be set aside as warm memory 122. In one embodiment, data stored in warm memory 122 is persisted across warm boots. Further details related to creation and use of warm memory for persisting data across warm boots are provided in U.S. Non-Provisional application Ser. No. 12/842,945 filed concurrently with the present application.

Volatile memory 114 allocated to partition P2 may comprise a section 124 storing an operating system OS2 operating on P2, a section 126 storing data related to one or more entities executed by partition P2. A section 128 of volatile memory 114 may optionally be set aside as warm memory to store data that is to be persisted across a warm boot of that partition.

Shared memory 116 may be shared by different partitions and also by hypervisor 130. Shared memory 116 may be shared by entities from the same partition or by entities from different partitions. A portion 129 of shared memory 116 may be optionally set aside as warm memory that enables stored data to be persisted across a warm boot. In one embodiment, shared memory 116 may be used for messaging between the sharers. Warm memory 129 may be shared between multiple entities, including applications/processes/threads executed by one or more partitions, different operating systems and their components, and the hypervisor. In one embodiment, shared memory 116 is configured such that the contents stored in the shared memory are not affected by a boot of a single partition.

The hardware resources of system 100, including I/O devices 106 and other hardware resources 108, may also be partitioned between partitions P1 and P2. A hardware resource may be assigned exclusively to one partition or alternatively may be shared between multiple partitions. For example, in one embodiment, a private Ethernet interface may be assigned to each partition, while access to PCIe may be shared between the partitions. In one embodiment, even though access to PCIe may be shared between the active and standby partitions, PCIe enumeration is performed only by the active partition.

Hypervisor 130 is a software program that facilitates secure partitioning of resources between the partitions of system 100 and management of the partitions. Hypervisor 130 enables multiple operating systems to run concurrently on system 100. Hypervisor 130 presents a virtual machine to each partition and allocates resources between the partitions. For example, the allocation of memory, processing, and hardware resources, as described above, may be facilitated by hypervisor 130. In one embodiment, hypervisor 130 may run directly on processor 102 as an operating system control.

Hypervisor 130 may present a virtual machine to each partition. For example, a virtual machine VM1 may be presented to partition P1 and a virtual machine VM2 may be presented to partition P2. Hypervisor 130 may manage multiple operating systems executed by the partitions. Hypervisor 130 may also facilitate the management of various warm memory portions (e.g., warm memory portions 122, 128, and 129) set aside in volatile memory 104.

Each virtual machine for a partition may operate independently of the other partitions and may not even know that the other partition exists. The operating system executed for one partition may be the same as or different from the operating system for another partition. For example, in FIG. 1, operating system OS1 of P1 may be the same as OS2 of P2, OS1 may be a completely different operating system than OS2 (e.g., OS1 may be Linux while OS2 may be Windows), or OS1 and OS2 may be different instances or versions of the same operating system (e.g., OS1 may be LinuxV1 while OS2 may be LinuxV2). Operating systems for the partitions are also commonly referred to as guest operating systems. In this manner, each virtual machine or partition can be operated as an independent virtual system.

The warm memory portions depicted in FIG. 1 may be individually configured and managed. In one embodiment, for a warm memory configured for a partition, only entities related to that partition and the hypervisor are allowed to use that warm memory section. For example, only entities executed by P1 and hypervisor 130 can use warm memory 122. For warm memory, such as warm memory 129 in shared memory 116, that is shared between multiple partitions, entities from one or different partitions and the hypervisor may use the warm memory. Hypervisor 130 can accordingly use warm memories 122, 128, or 129. Each warm memory portion enables data stored in that portion to be persisted across a warm boot that restarts the operating system without cycling power to the system. In the context of a system providing multiple partitions, each running a virtual machine, a warm boot may be a warm boot of the partition or a warm boot of the entire system. When a partition is warm booted, the operating system for that partition is restarted without cycling power to the system. When the system is warm booted, the operating systems for all the partitions provided by the system may be restarted without cycling power to the system.

According to an embodiment of the present invention, the multiple partitions configured for system 100 enable system 100 to provide the active-standby model in which one partition of system 100 operates in "active" mode while another partition operates in "standby" mode. For example, in the embodiment depicted in FIG. 1, partition P1 is operating in active mode and partition P2 is operating in standby mode. The partition operating in active mode (the active partition) takes over and manages the hardware resources of system 100 and performs a set of functions performed by system 100. The partition operating in standby mode (the standby partition) is passive and does not perform the set of functions. Conceptually, when operating in active mode the active partition performs a set of functions related to system 100 that are not performed by the standby partition. When a failover occurs, the standby partition becomes the active partition and takes over performance of the set of functions related to system 100 that were previously performed by the partition that was previously active. As a result, the set of functions related to the system continue to be performed without interruption. This reduces or even eliminates the downtime of the system's functionality, which translates to higher availability of the system. The previous active partition may then become the standby partition. The set of functions that are performed by the active partition and not performed by the standby partition may differ from system to system.

During normal operation of system 100, there may be some messaging that takes place between the active partition and the standby partition. For example, the active partition may use messaging to pass state information to the standby partition. The state information may comprise information that enables the standby partition to become the active partition upon a failover in a non-disruptive manner. Various different schemes may be used for the messaging including but not restricted to Ethernet-based messaging, PCI-based messaging, shared memory based messaging (such as using shared memory 116), and the like.

In the manner described above, even though system 100 comprises a single physical processor 102, it is capable of supporting multiple partitions with one partition configured to operate in active mode and another partition configured to operate in standby mode. This enables the single physical processor 102 to support the active-standby model. This in turn enhances the availability of system 100.

There are different ways in which one or more cores of a multi-core processor such as processor 102 depicted in FIG. 1 may be allocated to partitions. In the configuration depicted in FIG. 1, cores C1 and C2 are allocated to partition P1 and cores C3 and C4 are allocated to partition P2. In this configuration, the cores allocated to active partition P1 do not overlap with the cores allocated to standby partition P2. However, in alternative embodiments, a core may be added or removed from a partition depending upon whether the partition is operating in active mode or in standby mode. For example, in one embodiment, system 100 depicted in FIG. 1 may be configured such that three of the four cores of processor 102 are allocated to the active partition and the standby partition is allocated only one core. In such an embodiment, when partition P1 is operating in active mode, it may be allocated cores C1, C2, and C3, with core C4 being allocated to standby partition P2. When partition P2 becomes the active partition in response to a failover event, cores C2 and C3, which were initially allocated to P1, may be reallocated to partition P2. Accordingly, when partition P2 becomes the active partition it is allocated cores C2, C3, and C4 and core C1 remains allocated to standby partition P1. This dynamic allocation of cores to the active partition may be needed, for example, in situations where, due to the processing resources required by functions executed by the active partition, the cores allocated to a partition in standby mode are not sufficient when the standby partition becomes the active partition. Various other core allocation techniques may be used in alternative embodiments.

Figure 2A:
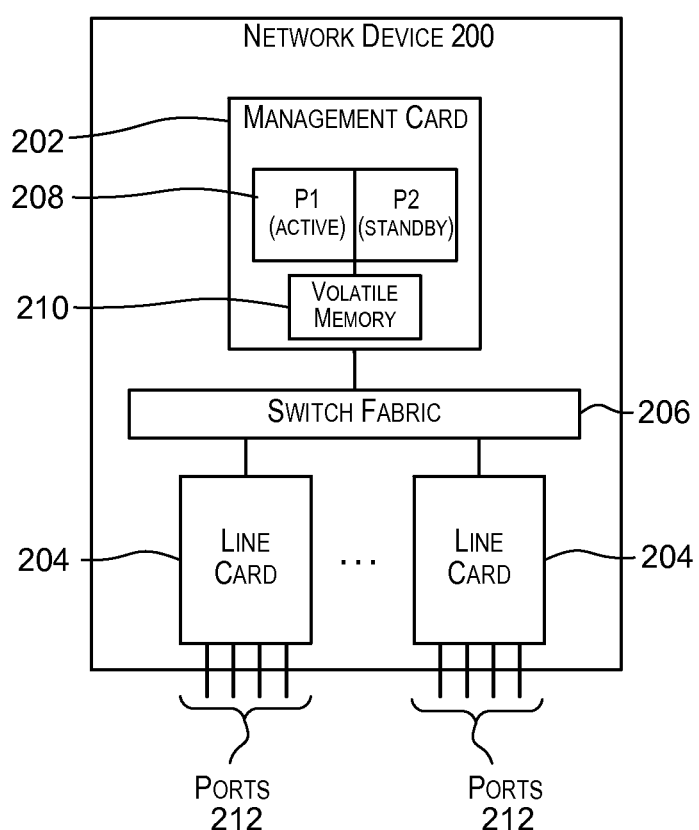
FIGS. 2A, 2B, and 2C depict examples of systems that may incorporate embodiments of the present invention.
Figure 2B:
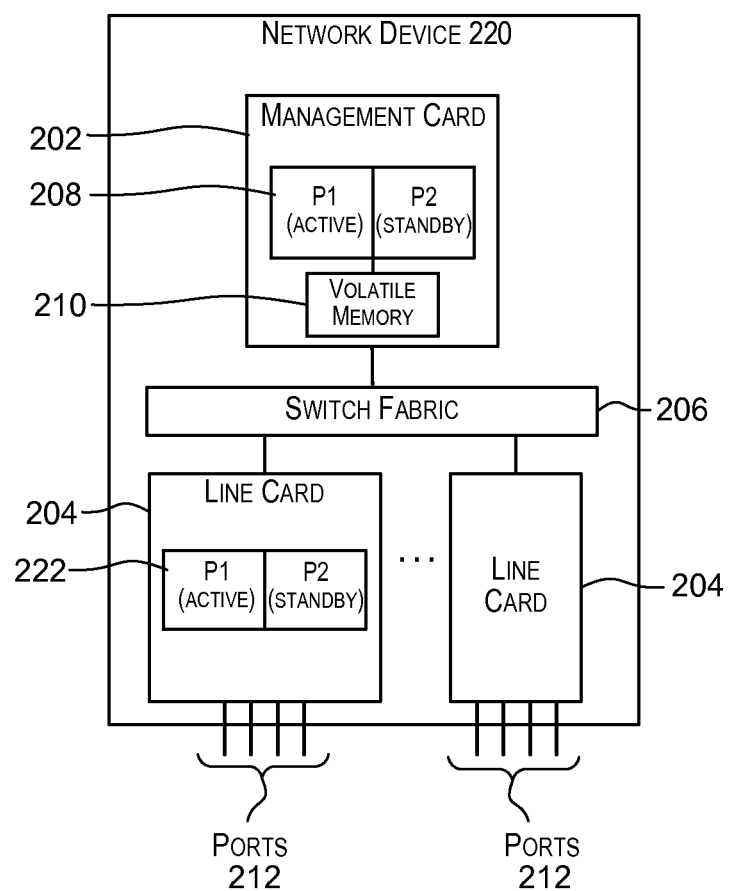
Figure 2C:
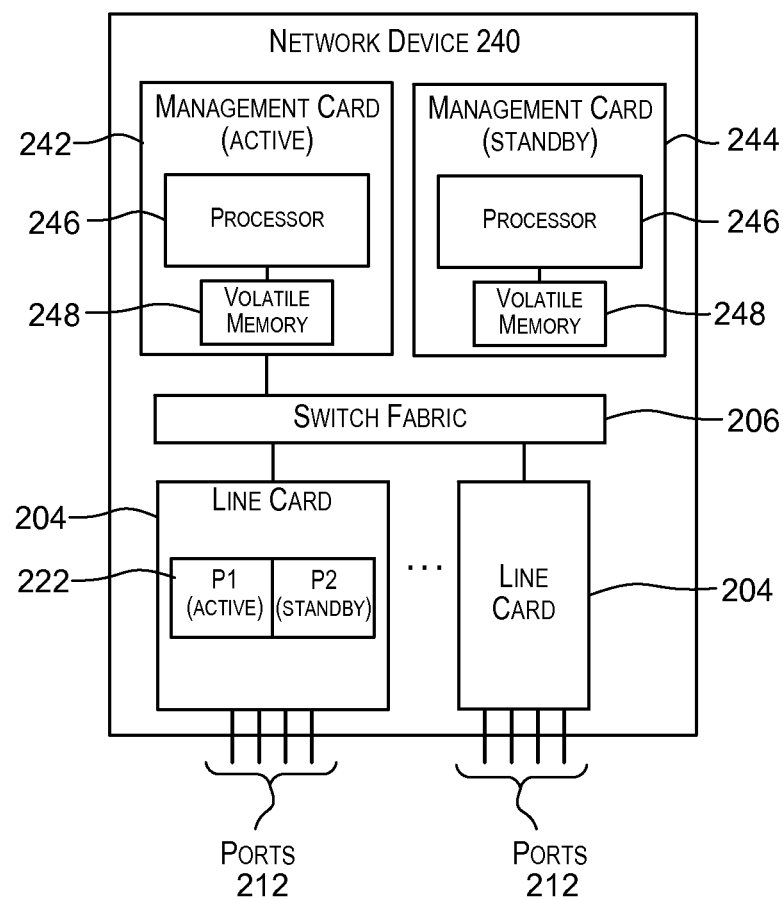

System 100 may be embodied in various different systems. For example, in one embodiment, system 100 may be embodied in a network device such as a switch or router provided by Brocade Communications Systems, Inc. A network device may be any device that is capable of forwarding data. The data may be received in the form of packets. FIGS. 2A, 2B, and 2C depict examples of network devices that may incorporate system 100 according to an embodiment of the present invention. FIG. 2A depicts a simplified block diagram of a network device 200 that may incorporate an embodiment of the present invention. In the embodiment depicted in FIG. 2A, network device 200 comprises a plurality of ports 212 for receiving and forwarding data packets and multiple cards that are configured to perform processing to facilitate forwarding of the data packets to their intended destinations. The multiple cards may include one or more line cards 204 and a management card 202. In one embodiment, a card, sometimes also referred to as a blade or module, can be inserted into one of a plurality of slots on the chassis of network device 200. This modular design allows for flexible configurations with different combinations of cards in the various slots of the device according to differing network topologies and switching requirements. The components of network device 200 depicted in FIG. 2A are meant for illustrative purposes only and are not intended to limit the scope of the invention in any manner. Alternative embodiments may have more or less components than those shown in FIG. 2A.

Ports 212 represent the I/O plane for network device 200. Network device 200 is configured to receive and forward packets using ports 212. A port within ports 212 may be classified as an input port or an output port depending upon whether network device 200 receives or transmits a data packet using the port. A port over which a data packet is received by network device 200 is referred to as an input port. A port used for communicating or forwarding a data packet from network device 200 is referred to as an output port. A particular port may function both as an input port and an output port. A port may be connected by a link or interface to a neighboring network device or network. Ports 212 may be capable of receiving and/or transmitting different types of data traffic at different speeds including 1 Gigabit/sec, 10 Gigabits/sec, 100 Gigabits/sec, or even more. In some embodiments, multiple ports of network device 200 may be logically grouped into one or more trunks.

Upon receiving a data packet via an input port, network device 200 is configured to determine an output port to be used for transmitting the data packet from the network device to facilitate communication of the packet to its intended destination. Within network device 200, the packet is forwarded from the input port to the determined output port and then transmitted from network device 200 using the output port. In one embodiment, forwarding of packets from an input port to an output port is performed by one or more line cards 204. Line cards 204 represent the data forwarding plane of network device 200. Each line card may comprise one or more packet processors that are programmed to perform forwarding of data packets from an input port to an output port. In one embodiment, processing performed by a line card may comprise extracting information from a received packet, performing lookups using the extracted information to determine an output port for the packet such that the packet can be forwarded to its intended destination, and to forward the packet to the output port. The extracted information may include, for example, the header of the received packet.

Management card 202 is configured to perform management and control functions for network device 200 and thus represents the management plane for network device 200. In one embodiment, management card 202 is communicatively coupled to line cards 204 via switch fabric 206. In the embodiment depicted in FIG. 2, management card 202 comprises a single physical multi-core processor 208 and associated volatile memory 210. Processor 208 may be a general purpose multi-core microprocessor such as one provided by Intel, AMD, ARM, Freescale Semiconductor, Inc., and the like, that operates under the control of software stored in associated memory 210.

According to an embodiment of the present invention, system 100 depicted in FIG. 1 may be embodied in management card 202 depicted in FIG. 2A. The processing resources of multi-core processor 208 may be partitioned into multiple partitions. In the embodiment depicted in FIG. 2A, the cores are partitioned into a partition P1 and a second partition P2. Each partition may be allocated one or more cores of the multi-core processor. The memory and I/O resources of management card 502 may also be partitioned between partition P1 and partition P2. In one embodiment, one partition may be configured to operate in active mode while the other operates in standby mode. For example, as depicted in FIG. 2A, partition P1 is operating in active mode (the active partition) while partition P2 operates in standby mode (the standby partition). The active partition may be configured to execute applications for performing management functions such as maintaining routing tables, programming line cards 204 (e.g., downloading information to a line card that enables the line card to perform data forwarding functions), and the like. The active partition may also perform data forwarding functions. When a failover occurs, standby partition P2 may then become the active partition and take over performance of the set of functions performed by an active partition. The previous active partition may then become the standby partition.

By providing multiple partitions, each capable of operating independently of the other partition, management card 202 is able to provide processing element redundancy. This redundancy enables management card 202 to support the active-standby model wherein one partition is configured to operate in active mode (as the active partition) and another partition is configured to operate in standby mode. The ability to support the active-standby model, even though management card 202 comprises a single physical processor 208, enhances the availability of management card 202 and allows it to support various high-availability networking protocols such as graceful restart, non-stop routing (NSR), and the like.

FIG. 2B depicts another network device 220 that may incorporate an embodiment of the present invention. Network device 220 is similar to network device 200 depicted in FIG. 1 with the addition that one or more line cards 204 may each comprise a single physical multi-core processor 222 that can be partitioned into multiple partitions, each partition allocated one or more cores of the multiple cores provided by processor 222. The memory and I/O resources of line card 204 may also be partitioned between the partitions.

In one embodiment, for a line card 204, one partition may be configured to operate in active mode while another partition operates in standby mode. For example, as depicted in FIG. 2B, partition P1 of line card 204 is operating in active mode (the active partition) while partition P2 operates in standby mode (the standby partition). The active partition may be configured to execute applications for performing packet forwarding functions. For example, in one embodiment, the functions performed by the active partition may include maintaining routing tables, using the routing tables to program hardware components of that line card that are configured to process incoming packets to determine how the packets are to be forwarded, other data forwarding functions, and the like. When a failover occurs, standby partition P2 of line card 204 may then become the active partition and start performing processing performed by an active partition. The previous active partition may then become the standby partition.

By providing multiple partitions, each capable of operating independently of the other partition, a line card 204 is able to provide processing redundancy. This redundancy enables line card 204 to support the active-standby functionality wherein one partition is configured to operate in active mode (as the active partition) and another partition is configured to operate in standby mode. The ability to support the active-standby model, even though line card 204 comprises a single physical processor 222, enhances the availability of line card 204. For example, even though the active partition of a line card may run into problems, the functions performed by the active partition may be taken over by the standby partition, which then becomes the active partition. In this manner, the functionality of a line card is not interrupted in spite of a failure or problem with one of the partitions. Resources previously owned by the active partition will be taken over by the standby partition when it becomes active. The resource can be hardware resources (PCIe devices, memory, CPU cores, device ports, etc.) and software related resources (message queues, buffers, interrupts, etc).

FIG. 2C depicts yet another network device 240 that may incorporate an embodiment of the present invention. In network device 240, redundancy at the management card level is provided by providing two management cards 242 and 244, each with a single physical processor 246 coupled to memory 248. The management cards may be configured such that one management card is configured to operate in active mode (e.g., management card 242 in FIG. 2C) and the other management card is configured to operate in standby mode (e.g., management card 244 in FIG. 2C). Management card 244 may take over as the active management card upon a failover event. In the embodiment depicted in FIG. 2C, one or more of line cards 204 may be each configured to comprise single multi-core physical processors 222 that can be partitioned into one or more partitions. A line card 204 may thus be capable of providing active-standby capability, as described above with respect to FIG. 2B.

In one embodiment (not shown), a network device may be provided with a single physical multi-core CPU, where the CPU is configured to handle functions performed by a line card and a management card. Such a network device is sometimes referred to as a "pizza box." In such an embodiment, the CPU may be partitioned into multiple partitions, each partition being allocated one or more cores of the multi-core processor. One of the partitions may operate in active mode while another partition operates in standby mode.

Figure 3:
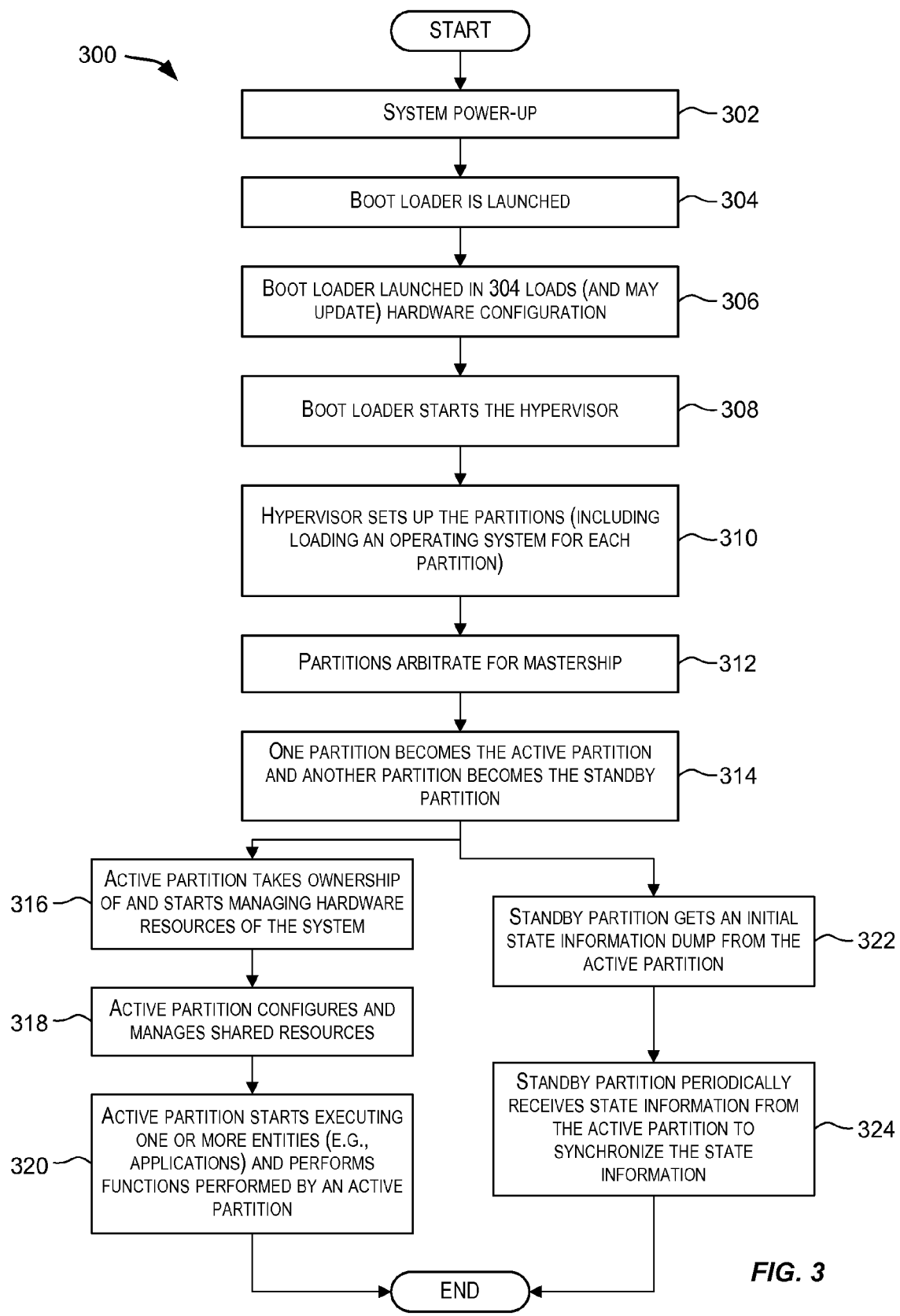
FIG. 3 depicts a simplified flowchart depicting high-level processing that may be performed upon recycling power to a system according to an embodiment of the present invention.

For a system comprising a single physical multi-core processor or CPU that can be partitioned into one or more partitions, processing may be performed to determine which partition becomes the active partition and which partition becomes the standby partition. For example, this processing may be performed upon a power-on reset (cold reset) of the system. FIG. 3 depicts a simplified flowchart 300 depicting high-level processing that may be performed upon recycling power to a system according to an embodiment of the present invention. The method may be embodied in software (e.g., code, program, instructions) executed by a processor. The software may be stored on a non-transitory computer-readable storage medium such as a hard disk drive, a floppy disk drive along with associated removable media, a Compact Disk Read Only Memory (CD-ROM) drive, an optical drive, removable media cartridges, and other like storage media. The method depicted in FIG. 3 is not intended to limit the scope of the invention as recited in the claims.

Processing may be initiated upon a power up of the system (step 302). The power up may be performed upon a cold boot or a power-on reset. A boot loader is then launched (step 304). The boot loader may run on one or more cores of processor 102.

The boot loader then loads and may update the hardware configuration for the system (step 306). The partition configuration may be determined statically based upon a configuration file loaded by the boot loader. The configuration data may be stored locally or retrieved from a remote location (e.g., from a remote server). The configuration data may identify the number of partitions to be configured for system 100, a set of cores of processor 102 to be assigned to each partition, and the operating system to be loaded for each partition. As part of 306, the boot loader may also determine the processor, memory, and hardware resources that are available for system 100. In one embodiment, the boot loader may dynamically adjust the partition configuration based on specific hardware resources available (typically based upon the amount of memory available).

The boot loader then starts the hypervisor (step 308). In one embodiment, the hypervisor is loaded in a section of the memory that is protected from access by the partitions. As part of 308, the boot loader may also pass hardware configuration information to the hypervisor. This information may identify the number of partitions, configuration information for each partition, and other information that may be used by the hypervisor for setting up the partitions.

The hypervisor then sets up the partitions (step 310). In one embodiment, based upon the hardware configuration information received from the boot loader, the hypervisor determines the partitions for the processor and how resources are to be allocated to the partitions. In one embodiment, a compact flash device may be provided for each partition and configured to store information for configuring the associated partition. As part of 310, the hypervisor may be configured to determine, for each partition, the compact flash corresponding to the partition and determine configuration information for the partition from the compact flash. The information for a partition may identify the operating system to be loaded in that partition.

While the hypervisor is responsible for setting up the partitions according to 310, the hypervisor does not determine how the system is to be partitioned. The hypervisor partitions the system based upon the configuration file (also sometimes referred to as a device tree) data loaded in 306. The configuration file may be set by a user or administrator of the system. The hypervisor is thus responsible for creating partitions defined by the configuration file data.

As part of 310, the hypervisor may launch an operating system for each partition. The operating system for a partition may be loaded in a section of memory configured for the partition. For example, in the embodiment depicted in FIG. 1, operating system OS1 may be loaded into memory 112 allocated to partition P1 and operating system OS2 may be loaded into memory 114 allocated to partition P2. As indicated above, the operating system launched for one partition may be the same as or different from the operating system launched for another partition. For a partition, an image of the operating system for that partition may be loaded into the memory assigned for the partition. For example, for the embodiment depicted in FIG. 1, operating system OS1 may be loaded into memory 112 assigned to partition P1 and operating system OS2 may be loaded into memory 114 assigned to partition P2.

The partitions then arbitrate for mastership (or active/standby status) (step 312). Processing is performed in 312 to determine which partition is to become the active partition and which partition is to be the standby partition. A deterministic algorithm is typically used to determine mastership. Processing for determining mastership is performed by the operating systems loaded for the partitions (also referred to as the guest operating systems) and not by the hypervisor or boot loader. Accordingly, while a hypervisor facilitates management of resources for partitions, it is not involved or required for processing related to mastership arbitration (and hence not essential for providing the high availability (HA) in a system.

As a result of the processing performed in 312, one partition becomes the active partition and the other one becomes the standby partition (step 314). The active partition then takes ownership of and starts managing hardware resources of the system (step 316). In one embodiment, the active partition may take control of all the hardware resources. Certain hardware resources may be shared between the active partition and the standby partition. The sharing is typically done to ensure that the process of the standby partition becoming the active partition in the event of a failover can occur with minimal impact in a non-disruptive manner. Accordingly, data can be shared between the partitions to facilitate a failover.

The active partition may then configure and manage any shared resources (step 318). For example, in FIG. 1, the active partition may set up shared memory 116 that is to be used for communicating information between the active partition P1 and the standby partition P2.

The active partition may then start running one or more applications and perform functions performed by an active partition (step 320). For example, if system 100 is embodied in a line card of a network device, the applications may include applications for forwarding data packets received by the network device. The active partition on a line card may perform functions such as managing I/O devices, managing control state, programming hardware (e.g., programming hardware-based data packet processors), sending out control packets, maintaining protocol/state information, maintaining timing information/logs, and other functions performed by a line card in a network device.

For the partition that comes up as a standby partition, the standby partition gets an initial state information dump from the active partition (step 322). The standby partition then periodically receives state information updates from the active partition such that the state information for the standby partition is synchronized with the state information for the active partition. The communication of state information from the active partition to the standby partition is performed as part of the functions performed by the active partition in 320. The active partition may communicate state information to the standby partition using, for example, a messaging mechanism. In one embodiment, the active partition is configured to periodically check if the state information on the standby partition is synchronized with the state information on the active partition. If not in sync, then the active partition communicates state information to the standby partition to bring its state information in synchrony with the state information on the active partition. In one embodiment, a change in state information on the active partition (e.g., a configuration change) may cause the active partition to synchronize the state information with the standby partition. Accordingly, in one embodiment, the standby partition does not interact with the resources owned/managed by the active partition. The standby partition receives the state information from the active partition.

The state information that is synchronized or shared between the active partition and the standby partition may comprise information that is needed by the standby partition to become the active partition when a failover event occurs in a non-disruptive manner. State information may comprise of application data (routing tables, queue structures, buffers, etc) and hardware specific state information (ASIC configuration tables, port maps, etc). In one embodiment, the active partition may not even know the existence of the standby partition. In another embodiment, the active and the standby partitions may be aware of each other. For example, the active partition may know the presence and state (healthy or degraded) of the standby partition. Knowing the state enables the active partition to determine whether a failover to the standby can be performed without causing data disruption.

As described above, a single physical multi-core processor may be partitioned into multiple partitions with one partition being configured as the active partition and another partition configured as the standby partition. The active partition is configured to perform a set of functions related to the system that are not performed by the standby partition. When a failover event occurs, the standby partition becomes the active partition and starts performing the set of functions that were previously performed by the partition that was previously active.

In the embodiment described above, one partition operates in active mode and another operates in standby mode. In alternative embodiments, there may be multiple standby partitions. In such an embodiment, one of the multiple standby partitions may become the active partition upon a failover. The new active partition then resets the former active partition to make it the standby partition.

In one embodiment, at a high level, failover events, i.e., events that cause a failover to occur, may be categorized into one of the following two categories:
(1) a voluntary failover event, and
(2) an involuntary failover event.

A voluntary failover event is one that causes the active partition to voluntarily yield control to the standby partition. For example, a command received from a network administrator to perform a failover is a voluntary failover event. There are various situations when this may be performed. As one example, a voluntary failover may be performed when software on the active partition is to be upgraded. In this situation, a system administrator may voluntarily issue a command/instruction to cause a failover to occur. Details related to processing performed during a failover are provided below. As another example, a voluntary failover may be initiated by the system administrator upon noticing a performance degradation on the active partition or upon noticing that software executed by the active partition is malfunctioning—in these cases, the network administrator may voluntarily issue a command for a failover with the hope that problems associated with the active partition will be remedied when the standby partition becomes the new active partition. Various interfaces, including a command line interface (CLI), may be provided for initiating a voluntary failover. Various events that occur in or are detected by a system providing a multi-core CPU or of which the system receives notification may qualify as a failover event.

An involuntary failover typically occurs due to some critical failure in the active partition. Examples include when a hardware watchdog timer goes off (or times out) and resets the active partition, possibly due to a problem in the kernel of the operating system loaded for the active partition, critical failure of software executed by the active partition, loss of heartbeat, and the like. An involuntary failover event causes the standby partition to automatically become the active partition. An involuntary failover event may be any event that occurs and/or is detected by a system comprising a multi-core processor.

Events that cause a voluntary or involuntary failover may come in different forms. A multi-core CPU system may be configured such that various events that occur in the system, or are detected by the system, or of which the system receives a notification may cause a failover to occur, as a result of which the standby partition becomes the active partition and the active partition may become the standby partition.

Figure 4:
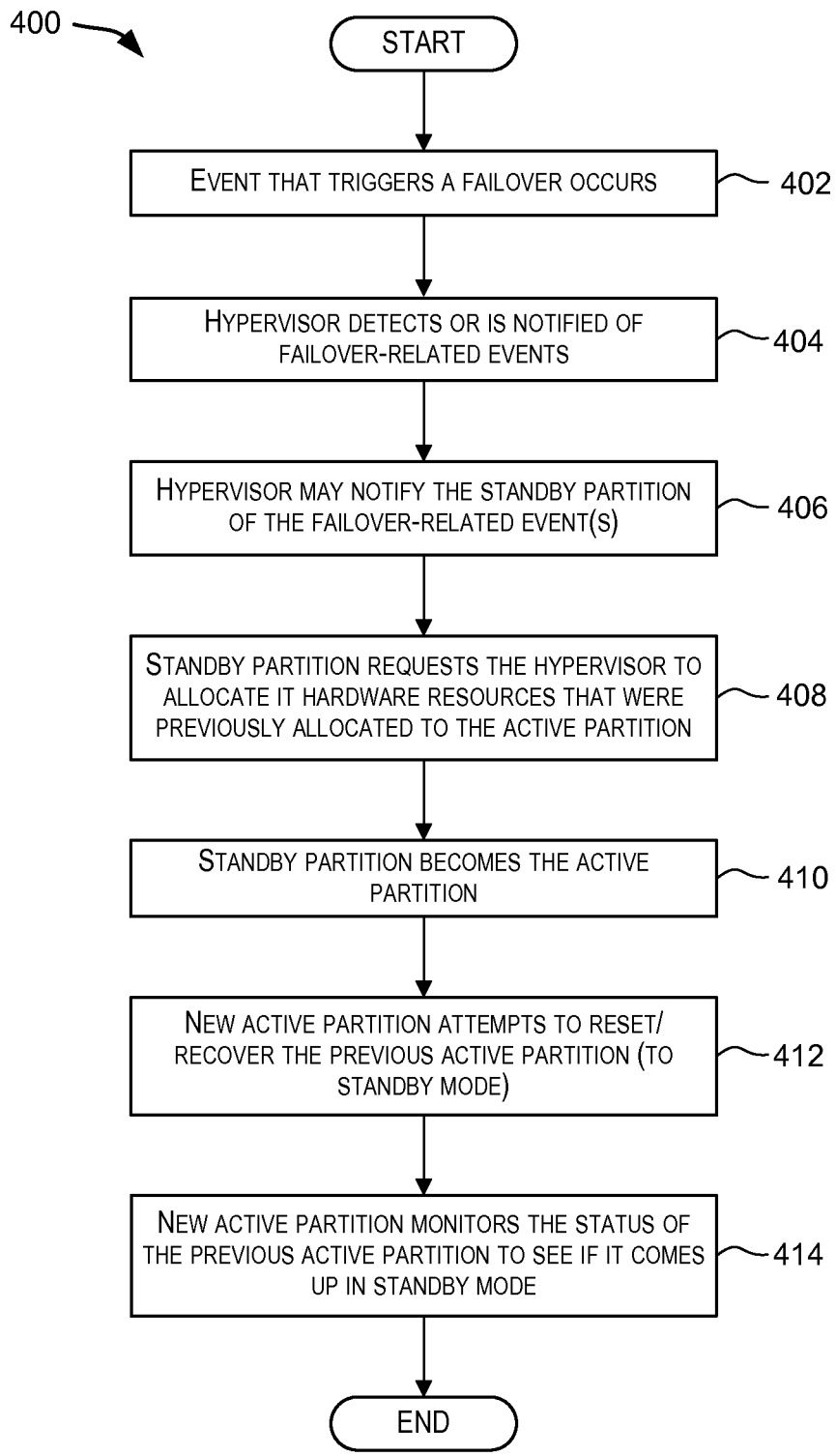
FIG. 4 depicts a simplified flowchart depicting high-level processing that may be performed upon the occurrence of a failover event according to an embodiment of the present invention.

FIG. 4 depicts a simplified flowchart 400 depicting high-level processing that may be performed upon the occurrence of a failover event according to an embodiment of the present invention. The method may be embodied in software (e.g., code, program, instructions) executed by a processor. The software may be stored on a non-transitory computer-readable storage medium such as a hard disk drive, a floppy disk drive along with associated removable media, a Compact Disk Read Only Memory (CD-ROM) drive, an optical drive, removable media cartridges, and other like storage media. The method depicted in FIG. 4 is not intended to limit the scope of the invention as recited in the claims. For purposes of explaining FIG. 4, it is assumed that at the start of the processing, partition P1 is operating in active mode and partition P2 is operating in standby mode (or may even be stopped).

As depicted in FIG. 4, processing may be initiated upon detecting the occurrence of a failover event (step 402). The failover event (i.e., an event that triggers a failover) may be a voluntary or an involuntary failover event. One example of a failover event is when the active partition P1 reboots. This may occur either voluntarily or involuntarily. For example, this may occur due to a kernel panic, a watch dog timer being timed out, a system reboot, a trap, receipt of a reboot command (e.g., via a CLI), and the like.

The hypervisor detects or is notified of a failover-related event (step 404). The failover-related event may be a failover event itself (e.g., a catastrophic failure on the active partition, a watchdog timer going off, a boot of the active partition, etc.) or a signal or interrupt caused by a failover event. The hypervisor then sends a notification to the standby partition (P2) about the failover-related event (step 406). For example, the hypervisor may send a notification to the standby partition (P2) that the active partition (P1) has rebooted.

The detection or notification of failover-related events is not restricted to the hypervisor. The hypervisor may not even be involved with the detection or notification. For example, the active partition may itself send a notification to the standby partition of a failover-related event. For example, the active partition may send a notification to the standby partition that the active partition is to reboot. The standby partition may also be capable of detecting failover-related events and take over as the active partition.

The standby partition (P2) then requests the hypervisor to allocate it hardware resources that were previously allocated to the active partition (P1) (step 408). As part of 408, the standby partition (P2) may also request the hypervisor to stop the active partition (P1) such that resources held by the active partition can be reallocated to the standby partition (P2).

The standby partition (P2) then takes over as the new active partition and starts active processing (step 410). In one embodiment, as part of 410, the new active partition may perform processing depicted in steps 316, 318, and 320 described above with respect to FIG. 3. Failover is deemed successful when the new active partition assumes control and starts functioning.

The new active partition (P2) may then attempt to restart the previous active partition (P1) (step 412). As part of 412, the new active partition (P2) may request the hypervisor to restart partition P1. Partition P1 will assume the standby role when it comes upon detecting that another partition is operating as an active partition. In one embodiment, the new active partition may monitor the status of partition P1 to see if it comes up successfully in standby mode (step 414). If the partition successfully comes up as the standby partition, then the active partition knows that in the case of another failover event, a standby partition is available to take over as the active partition without disrupting the functionality of the system. If the active partition determines that the previously active partition could not successfully come up in standby mode, then it indicates to the active partition that, due to the non-availability of a standby partition, a subsequent failover event may cause disruption of service for the system.

In one embodiment, if any of the processing steps depicted in FIG. 4 and described above fail, then the hypervisor may be configured to perform a power-on reset. The power-on reset may then cause processing depicted in FIG. 3 to be performed.

After the standby partition becomes the active partition in 410, it synchronizes its state information with that of the previous active partition. As previously discussed, during normal processing, the active partition may communicate state information to the standby partition to update the state information of the standby partition. After the standby partition becomes the active partition, it checks whether the state information that it has received from the active partition is synchronized with the state information of the previous active partition. If the information is deemed to be synchronized, then the standby partition continues as the active partition. If the information is not synchronized or if the warm recovery fails, then the standby partition may perform functions to recover the state information, including potentially initiating cold recovery functions (e.g., reset hardware) to reinitialize its operational state information. The active partition then continues to operate in active mode.

In one embodiment, a failover may be used for making software/firmware (software in general) upgrades to a system without disrupting processing performed by the system. For example, if the system is a network device, a failover may be used to upgrade software for the network device without disrupting traffic forwarding/switching performed by the network device. The upgrade may be stored in non-volatile memory. In one embodiment, the non-volatile memory may store information for the different partitions. In one embodiment, compact flash (CF) serves as the non-volatile memory for storing the information. For example, in one embodiment, each partition has a corresponding CF that may be used to store the upgrades for that partition. In an alternative embodiment, a CF may store information for multiple partitions. In other embodiments, other types of non-volatile memory may also be used.

As discussed above, in one non-limiting embodiment, a CF may be provided for each partition and store information for the partition. In one such embodiment, the CF for a partition may be divided into a primary volume (CF_P) and a secondary volume (CF_S). The primary volume may be used for providing the root file system for the partition and the secondary volume may be used for software upgrades for the partition.

Figure 5:
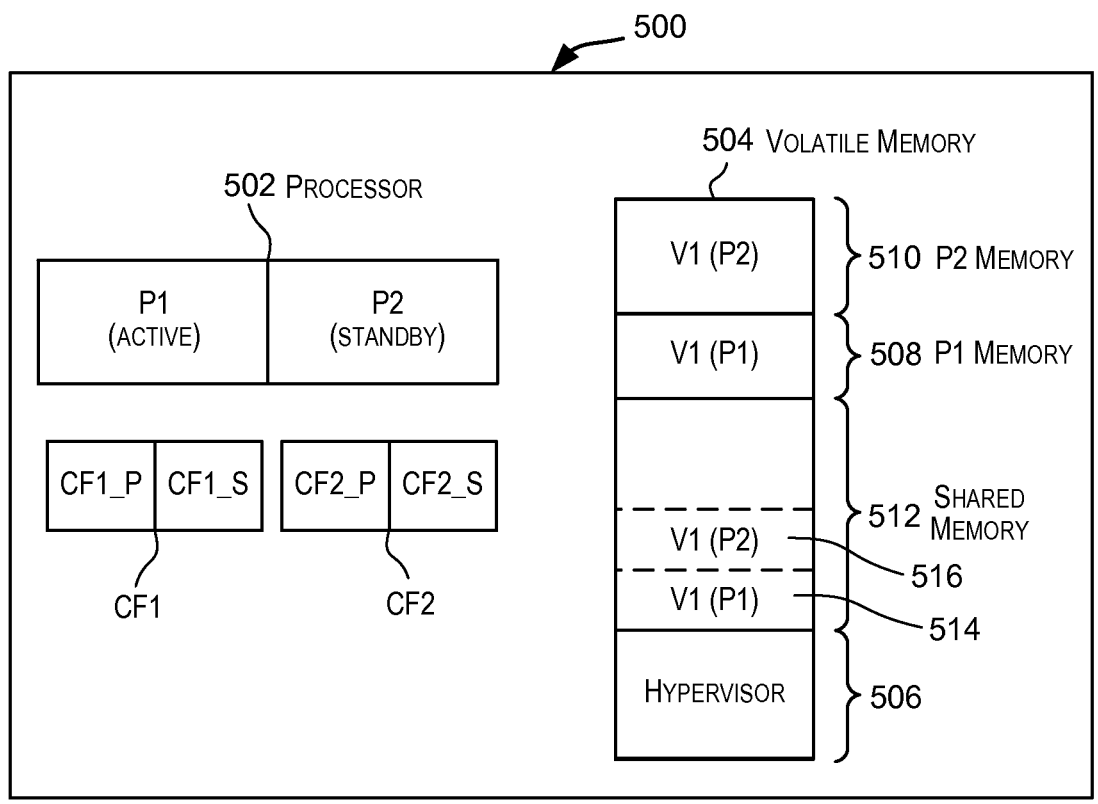
FIG. 5 depicts a simplified single physical multi-core processor system according to an embodiment of the present invention.

FIG. 5 depicts a simplified single physical multi-core processor system 500 according to an embodiment of the present invention. System 500 comprises a single physical processor 502 coupled to volatile memory 504. The processing resources provided by processor 502 are partitioned into two partitions P1 and P2, with P1 operating in active mode and P2 operating in standby mode. For example, if processor 502 is a dual-core processor, then a first core C1 may be allocated to P1 and a second core C2 may be allocated to P2. Volatile memory 504 may comprise a section 506 for the hypervisor, a section 508 that is private to P1, a section 510 that is private to P2, and a section 512 that is shared between the partitions. As depicted in FIG. 5, an operating system version 1 (V1) is loaded for both partitions in their private memory sections.

In the embodiment depicted in FIG. 5, a compact flash device is provided for each partition with CF1 provided for P1 and CF2 provided for P2. The CFs do not have to be physically separated. A CF may be virtualized within the hypervisor such that each partition sees its own dedicated virtual CF device. Each CF is divided into a primary volume and a secondary volume. For example, CF1 for P1 is divided into a primary volume CF1_P and a secondary volume CF1_S. Likewise, CF2 for P2 is divided into a primary volume CF2_P and a secondary volume CF2_S. For a partition, the primary volume of the CF may be used for providing the root file system for the partition and the secondary volume of the CF may be used for software upgrades for the partition. For example, CF1_S and CF2_S may each be used to store a package corresponding to a version (e.g., V1) of software that is loaded for the partitions. In one embodiment, for each partition, an image of V1 may be extracted from the secondary CF volume for the partition and loaded into a portion of shared memory 512. For example, as shown in FIG. 5, an image V1 extracted from CF1_S is stored in section 514 of shared memory 512 for P1 and an image V1 extracted from CF2_S is stored in section 516 of shared memory 512 for P2. The images stored in shared memory 512 may then be used to load the operating systems in the private memories of the partitions. Accordingly, the software images may be stored in the private memory of each partition. When the hypervisor is instructed to restart the partition, it will move the image to hypervisor private memory and then restart the partition with the new image.

Figure 6:
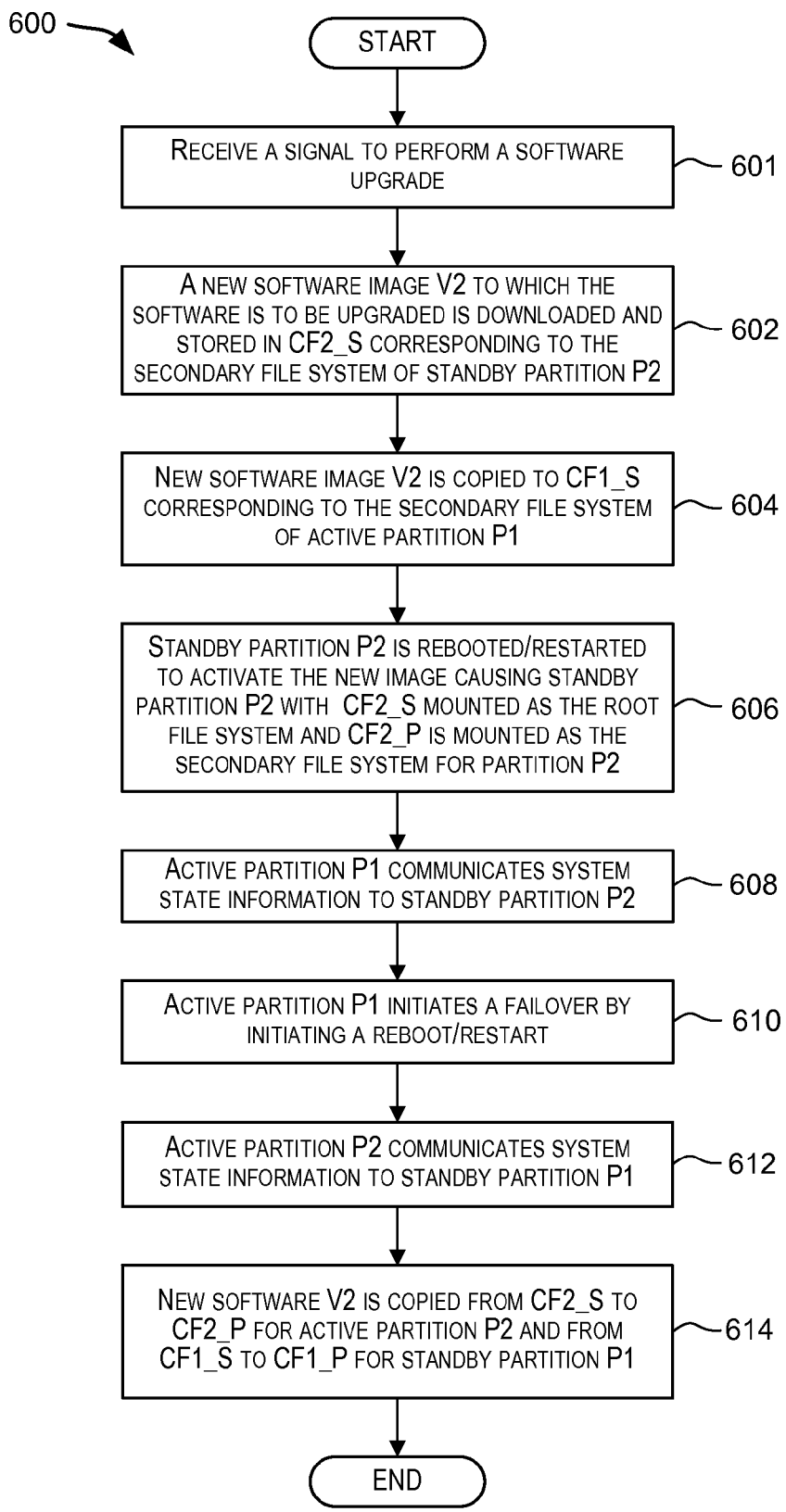
FIGS. 6 and 7 depict simplified flowcharts depicting high-level processing that may be performed for performing software upgrades according to an embodiment of the present invention.
Figure 7:
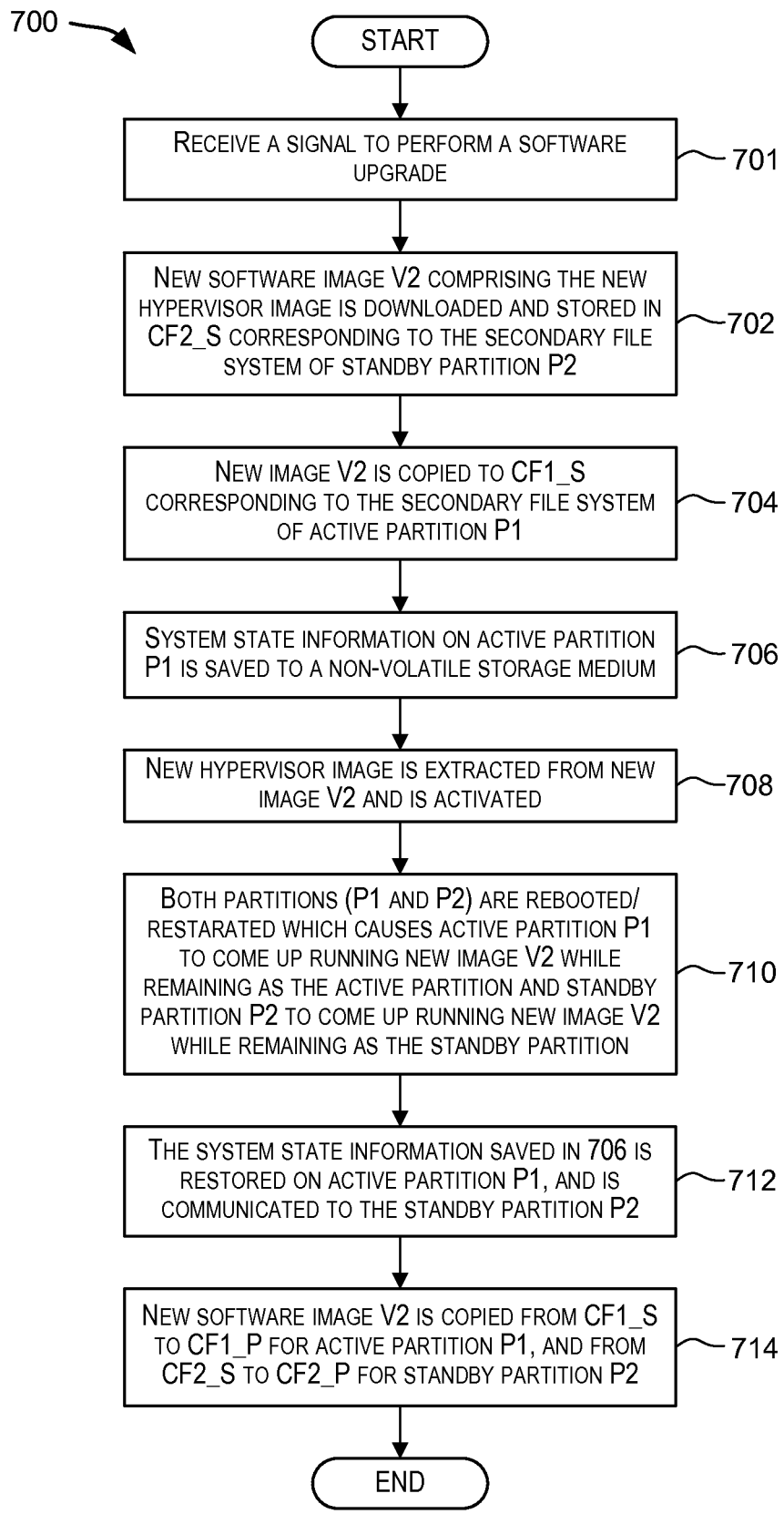
Figure 7:
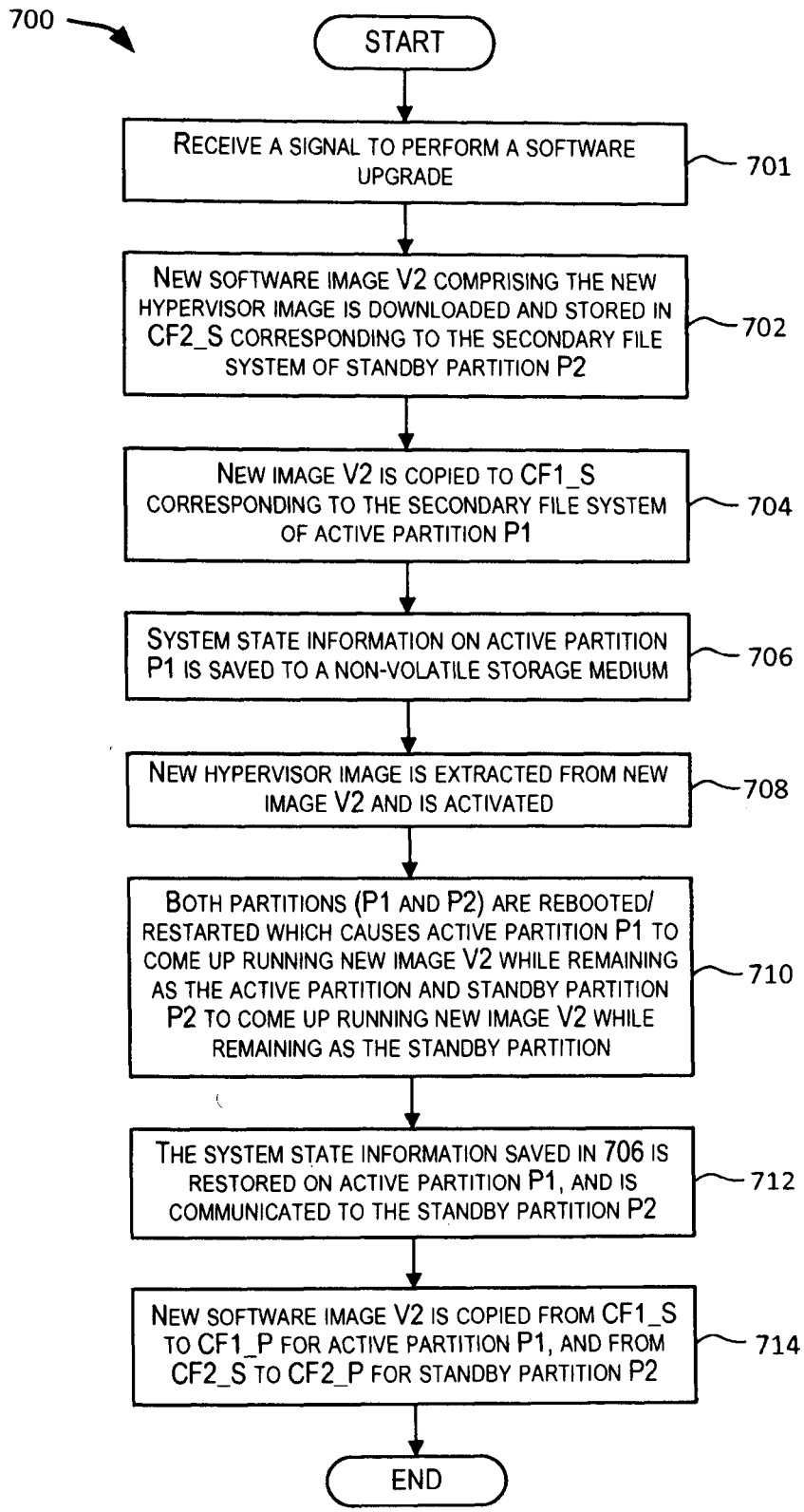

FIGS. 6 and 7 depict simplified flowcharts 600 and 700 depicting high-level processing that may be performed for performing a software upgrade according to an embodiment of the present invention. The methods may be embodied in software (e.g., code, program, instructions) executed by a processor. The software may be stored on a non-transitory computer-readable storage medium such as a hard disk drive, a floppy disk drive along with associated removable media, a Compact Disk Read Only Memory (CD-ROM) drive, an optical drive, removable media cartridges, and other like storage media. The methods depicted in FIGS. 6 and 7 are not intended to limit the scope of the invention as recited in the claims. The processing in FIGS. 6 and 7 is described in conjunction with system 500 depicted in FIG. 5. It is assumed that the software is to be upgraded from a first version (V1) to a second version (V2) of the operating system.

In one embodiment, there are two different situations for software upgrades. The first case involves upgrading the software executed by a partition and does not involve the upgrade of the hypervisor image. A method for performing such an upgrade is depicted in FIG. 6. The second case involves upgrading the hypervisor image. A method for performing such an upgrade is depicted in FIG. 7. The two cases are different because when upgrading the hypervisor, both partitions P1 and P2 are rebooted at the same time.

As depicted in FIG. 6, processing may be initiated upon receiving a signal to perform a software upgrade (step 601). For example, the processing may be initiated by an administrator of system 500. The administrator may issue a command (e.g., via CLI) for initiating a software upgrade.

A new software image V2 to which the software is to be upgraded is downloaded and stored in CF2_S corresponding to the secondary file system of standby partition P2 (step 602). The new software image V2 is then copied to CF1_S corresponding to the secondary file system of active partition P1 (step 604).

Standby partition P2 is then rebooted/restarted to activate the new image (step 606). As a result of 606, standby partition P2 comes up running the new software image V2 and still remains the standby partition. CF2_S is mounted as the root file system and CF2_P is mounted as the secondary file system for partition P2.

Active partition P1 communicates the system state information to standby partition P2 (step 608). Active partition P1 then initiates a failover by initiating a reboot/restart (step 610). As a result of the failover, standby partition P2 becomes the active partition. Also, as a result of the failover, partition P1 comes back up running the new software image V2 and becomes the standby partition. CF1_S is mounted as the root file system and CF1_P is mounted as the secondary file system for partition P1.

Active partition P2 communicates the system state information to standby partition P1 (step 612). New software V2 is then copied from CF2_S to CF2_P for active partition P2 and from CF1_S to CF1_P for standby partition P1 (step 614). Now all of the volumes have the new software image.

In the manner described above, a software upgrade may be performed in a non-disruptive manner without interrupting processing performed by system 500. For example, if system 500 were a management card in a network device (such as management card 202 depicted in FIG. 2A), the upgrade may be performed without interrupting processing performed by the management card. As another example, if system 500 were embodied in a line card in a network device (such as line card 204 depicted in FIG. 2B), the line card firmware may be upgraded without interrupting packet forwarding processing performed by the line card. In this manner, the availability of the management card and/or the line card is increased (or in other words the downtime of the management card and/or the line card is reduced). The process of upgrading a line card or a management card is also simplified thereby enabling the upgrade to be performed in a faster time.

FIG. 7 depicts a flowchart 700 depicting a method for upgrading the hypervisor according to an embodiment of the present invention. As depicted in FIG. 7, processing may be initiated upon receiving a signal to perform a software upgrade (step 701). For example, the processing may be initiated by an administrator of system 500. The administrator may issue a command (e.g., via CLI) for initiating a software upgrade.

New software image V2 comprising the new hypervisor image is downloaded and stored in CF2_S corresponding to the secondary file system of standby partition P2 (step 702). V2 is then copied to CF1_S corresponding to the secondary file system of active partition P1 (step 704).

The system state information on active partition P1 is saved to a non-volatile storage medium (step 706). In one embodiment, some of the techniques described in U.S. Pat. No.

7,188,237, 7,194,652, or 7,284,236 may be used for saving the system state information in the context of partitions within a single CPU. The entire contents of these patents are incorporated herein by reference for all purposes. Other techniques may be used in alternative embodiments.

The new hypervisor image is then extracted from new image V2 and is activated (step 708). As a result of 708, both active partition P1 and standby partition P2 need to be rebooted. Both partitions are rebooted (step 710). As a result of 710, active partition P1 comes up running new image V2 while remaining as the active partition and standby partition P2 comes up running new image V2 while remaining as the standby partition. CF1_S is mounted as root file system and CF1_P is mounted as secondary partition for active partition P1. CF2_S is mounted as the root file system and CF2_P is mounted as the secondary file system for standby partition P2.

The system state information saved in 706 is restored on active partition P1, and is communicated to the standby partition P2 (step 712). In one embodiment, the method for saving the system state information as described in U.S. Pat. No. 7,188,237, 7,194,652, or 7,284,236 may be used for saving the system state information in the context of partitions within a single CPU. The entire contents of these patents are incorporated herein by reference for all purposes. Other methods may be used in alternative embodiments.

New software image V2 is then copied from CF1_S to CF1_P for active partition P1, and from CF2_S to CF2_P for standby partition P2 (step 714). Now all of the volumes have the new software images.

As described above, techniques are provided that enable an active-standby model to be provided by a single physical multi-core processor. By providing for multiple partitions with one partition operating in active mode and another operating in standby mode, a failover mechanism is provided whereby, when a failover event occurs (e.g., something goes wrong with the active partition, a software upgrade is to be performed), the standby partition can take over as the active partition and start performing the set of functions corresponding to the active mode without disrupting processing that is being performed by the system. As a result, the set of functions related to the system continue to be performed without interruption. This reduces or even eliminates the downtime of the system's functionality, which translates to higher availability of the system. In this manner, even if a system comprises only a single processor, the system can support active-standby mode functionality.

Various embodiments have been described above where a system comprises a single physical multi-core processor configured as described above. This enables the system to provide active-standby functionality even with one physical processor. The scope of the present invention is however not restricted to systems comprising a single physical processor. A multi-core processor configured as described above may also be provided in a system comprising multiple processors where the multi-core processor enables active-standby functionality.

Although specific embodiments of the invention have been described, various modifications, alterations, alternative constructions, and equivalents are also encompassed within the scope of the invention. Embodiments of the present invention are not restricted to operation within certain specific data processing environments, but are free to operate within a plurality of data processing environments. Additionally, although embodiments of the present invention have been described using a particular series of transactions and steps, it should be apparent to those skilled in the art that the scope of the present invention is not limited to the described series of transactions and steps.

Further, while embodiments of the present invention have been described using a particular combination of hardware and software, it should be recognized that other combinations of hardware and software are also within the scope of the present invention. Embodiments of the present invention may be implemented only in hardware, or only in software, or using combinations thereof.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims.

What is claimed is:

1. A system comprising:
   a memory; and
   a processor comprising a plurality of cores, the plurality of cores being partitioned into at least a first partition and a second partition, wherein a first set of cores from the plurality of cores is allocated to the first partition and a second set of cores from the plurality of cores is allocated to the second partition, the first set of cores being different from the second set of cores;
   wherein the first partition is configurable to operate in a first mode, wherein a set of functions is performed in the first mode;
   wherein, when the first partition is operating in the first mode, the second partition is configurable to operate in a second mode, wherein the set of functions is not performed in the second mode;
   wherein, in response to an event, the second partition is configurable to start operating in the first mode instead of the first partition and to start performing the set of functions corresponding to the first mode; and
   wherein the first partition is configurable to operate in the second mode after the second partition operates in the first mode.

2. The system of claim 1 wherein the memory is configurable to store a hypervisor for managing the first partition and the second partition.

3. The system of claim 1 further comprising a port, and wherein the set of functions comprises one or more functions related to processing of a packet received by the system via the port.

4. The system of claim 1 wherein the event is one of a reset or restart of the first partition, a software upgrade, a failure in operation of the first partition, a timeout, or an instruction to cause the second partition to operate in the first mode instead of the first partition.

5. A network device comprising:
   a port; and
   a processor comprising a plurality of cores, the plurality of cores being partitioned into at least a first partition and a second partition, wherein a first set of cores from the plurality of cores is allocated to the first partition and a second set of cores from the plurality of cores are allocated to the second partition;
   wherein the first partition is configurable to operate in a first mode, wherein a set of functions is performed in the first mode, the set of functions comprising one or more functions related to processing of a packet received via the port;
   wherein, when the first partition is operating in the first mode, the second partition is configurable to operate in a second mode, wherein the set of functions is not performed in the second mode;

wherein, in response to an event, the second partition is configurable to start operating in the first mode instead of the first partition and to start performing the set of functions corresponding to the first mode; and wherein the first partition is configurable to operate in the second mode after the second partition starts to operate in the first mode.

6. The network device of claim 5 further comprising:
a line card coupled to the port, wherein the line card comprises the processor.

7. The network device of claim 5 further comprising:
a line card coupled to the port; and
a management card coupled to the line card, the management card comprising the processor.

8. The network device of claim 5 wherein the event is one of a reset or restart of the first partition, a software upgrade of the network device, a failure in operation of the first partition, a timeout in the network device, or an instruction to cause the second partition to operate in the first mode instead of the first partition.

9. A method comprising:
operating, in a system comprising a processor providing a plurality of cores, a first partition in a first mode, the first partition allocated a first set of cores from a plurality of cores provided by a processor, wherein a set of functions is performed in the first mode;

operating, when operating the first partition in the first mode, a second partition in a second mode wherein the set of functions is not performed in the second mode, the second partition allocated a second set of cores from the plurality of cores provided by the processor;

in response to an event, causing the second partition to start operating in the first mode instead of the first partition and to start performing the set of functions corresponding to the first mode; and in response to the event, causing the first partition to operate in the second mode after the second partition starts operating in the first mode.

10. The method of claim 9 further comprising using a hypervisor for managing the first partition and the second partition.

11. The method of claim 9 further comprising:
receiving a packet via a port of the system; and
wherein the set of functions comprises one or more functions related to processing of the received packet.

12. The method of claim 9 wherein the event is one of a reset or restart of the first partition, a software upgrade, a failure in operation of the first partition, a timeout, or an instruction to cause the second partition to operate in the first mode instead of the first partition.

13. A method comprising:
receiving, by a network device, a packet via a port of the network device;
providing, by the network device, a processor comprising a plurality of cores, wherein a first set of cores from the plurality of cores are allocated to a first partition and a second set of cores from the plurality of cores are allocated to a second partition;
operating the first partition in a first mode, wherein a set of functions related to processing of the packet is performed in the first mode;
operating the second partition in a second mode when the first partition is operating in the first mode, wherein the set of functions is not performed in the second mode;
causing, responsive to an event, the second partition to start operating in the first mode instead of the first partition and to start performing the set of functions corresponding to the first mode; and
causing the first partition to operate in the second mode after the second partition starts to operate in the first mode.

14. The method of claim 13 further comprising:
providing, by the network device, a line card coupled to the port, the line card comprising the processor.

15. The method of claim 13 further comprising:
providing, by the network device, a line card coupled to the port;
providing, by the network device, a management card coupled to the line card, the management card comprising the processor.

16. The method of claim 13 wherein the event is one of a reset or restart of the first partition, a software upgrade, a failure in operation of the first partition, a timeout, or an instruction to cause the second partition to operate in the first mode instead of the first partition.

* * * * *

UNITED STATES PATENT AND TRADEMARK OFFICE
CERTIFICATE OF CORRECTION

PATENT NO. : 8,495,418 B2
APPLICATION NO. : 12/842936
DATED : July 23, 2013
INVENTOR(S) : Vineet M. Abraham et al.

It is certified that error appears in the above-identified patent and that said Letters Patent is hereby corrected as shown below:

In the References Cited item (56), under Foreign Patent Documents on title page 3:
Delete "EP 2084605 A2 5/2009" and insert --EP 2084605 A2 8/2009--

In the Drawings

The drawing sheet, consisting of Fig. 7, should be deleted to be replaced with the drawing sheet, consisting of Fig. 7, as shown on the attached page.

In the Specification

At Column 8, line 24:
Delete "card 502" and insert --card 202--

Signed and Sealed this
Twentieth Day of May, 2014

Michelle K. Lee
*Deputy Director of the United States Patent and Trademark Office*